United States Patent
Uno et al.

(10) Patent No.: US 8,380,062 B2
(45) Date of Patent: Feb. 19, 2013

(54) OPTICAL TRANSMISSION MODULE AND ELECTRONIC DEVICE

(75) Inventors: Keisuke Uno, Ikoma (JP); Yoshihisa Ishida, Otsu (JP); Akira Enami, Ashiya (JP); Hayami Hosokawa, Kyoto (JP)

(73) Assignee: OMRON Corporation, Kyoto (JP)

( * ) Notice: Subject to any disclaimer, the term of this patent is extended or adjusted under 35 U.S.C. 154(b) by 619 days.

(21) Appl. No.: 12/594,725

(22) PCT Filed: Apr. 3, 2008

(86) PCT No.: PCT/JP2008/056670
§ 371 (c)(1),
(2), (4) Date: Oct. 5, 2009

(87) PCT Pub. No.: WO2008/126755
PCT Pub. Date: Oct. 23, 2008

(65) Prior Publication Data
US 2010/0119236 A1 May 13, 2010

(30) Foreign Application Priority Data
Apr. 5, 2007 (JP) ................................ 2007-099917

(51) Int. Cl.
*H04B 17/00* (2006.01)
(52) U.S. Cl. ........... 398/38; 398/140; 398/141; 398/164
(58) Field of Classification Search ............. 398/45, 398/115–117, 140–142, 182, 202
See application file for complete search history.

(56) References Cited

U.S. PATENT DOCUMENTS
2003/0035186 A1 2/2003 Ide et al.
(Continued)

FOREIGN PATENT DOCUMENTS
EP 1607837 A2 12/2005
JP 1-166630 A 6/1989
(Continued)

OTHER PUBLICATIONS
International Search Report w/translation from PCT/JP2008/056670 dated May 20, 2008 (4 pages).
(Continued)

*Primary Examiner* — Li Liu
(74) *Attorney, Agent, or Firm* — Osha Liang LLP

(57) ABSTRACT

A light transmission module has a light transmitting unit having a light emitting portion for outputting an optical signal corresponding to a data signal input as an electrical signal, and a first power supply controller for controlling a drive power supply of the light emitting portion, a light transmission path for transmitting the optical signal introduced from the light transmitting unit, a light receiving unit having a light receiving portion for receiving the optical signal output from the light transmission path and outputting an electrical signal corresponding to the optical signal, and a second power supply controller for controlling a drive power supply of the light receiving portion, and at least one electrical transmission path, connecting the light transmitting unit and the light receiving unit, for transmitting a control signal for controlling power supply to the light emitting portion and the light receiving portion to the first power supply controller and the second power supply controller. The first power supply controller and the second power supply controller control the power supply to the light emitting portion and the light receiving portion based on the control signal input via the electrical transmission path.

16 Claims, 24 Drawing Sheets

U.S. PATENT DOCUMENTS

| | | |
|---|---|---|
| 2004/0076438 A1 | 4/2004 | Lee |
| 2005/0105913 A1* | 5/2005 | Ozeki et al. .................. 398/140 |
| 2005/0281555 A1* | 12/2005 | Tomita et al. .................. 398/45 |
| 2006/0067608 A1* | 3/2006 | Kobayashi et al. ............. 385/14 |
| 2007/0008530 A1* | 1/2007 | Gibbs et al. .................. 356/368 |
| 2010/0067915 A1* | 3/2010 | Fukasaku et al. ............. 398/116 |

FOREIGN PATENT DOCUMENTS

| | | |
|---|---|---|
| JP | 2-170631 A | 7/1990 |
| JP | 09-282060 * | 10/1997 |
| JP | 09-282060 A | 10/1997 |
| JP | 2000-152026 A | 5/2000 |
| JP | 2000-286804 * | 10/2000 |
| JP | 2000-286804 A | 10/2000 |
| JP | 2001-042150 A | 2/2001 |
| JP | 2004-179733 A | 6/2004 |
| JP | 2004-222291 A | 8/2004 |
| JP | 2005-018312 * | 1/2005 |
| JP | 2005-018312 A | 1/2005 |
| JP | 2005-167971 A | 6/2005 |
| JP | 2006-033804 A | 2/2006 |
| JP | 2007053675 A | 3/2007 |
| WO | 2006/071641 A2 | 7/2006 |

OTHER PUBLICATIONS

Written Opinion from PCT/JP2008/056670 dated May 20, 2008 (6 pages).

Japanese Office Action issued in Japanese Application No. 2009-509295 dated Jun. 28, 2011 and English translation thereof, 6 pages.

Supplementary European Search Report issued in corresponding European Application No. 08739777.4, mailed on Jan. 1, 2013 (8 pages).

* cited by examiner

OPTICAL TRANSMISSION MODULE AND ELECTRONIC DEVICE

TECHNICAL FIELD

The present invention relates to light interconnections for connecting circuit boards in an information transmission device such as a portable telephone with an optical signal, and in particular, to a light transmission path module for transmitting optical signals and an electronic device.

BACKGROUND ART

In recent years, higher speed in the transmission speed of data is demanded with increase in CPU clock frequency. However, in the conventional electric wiring, crosstalk and electromagnetic radiation become significant with higher speed of the transmission speed, and thus there is a limit to increasing the speed of the transmission speed. A method of connecting the CPU and various types of application circuits with a light transmission path such as a light guide, and transmitting a data signal as an optical signal has been attempted.

The light guide has a double structure of a center core, which is called a core, and a capsule covering the center core, which is called a clad, where the index of refraction of the core is higher than that of the clad. The optical signal that entered the core is propagated by repeating total reflection inside the core.

The schematic configuration of the light transmission module arranged in the light transmission path is described below using the drawings. FIG. 21(a) is a perspective view showing an outer appearance of the light transmission module, and FIG. 21(b) is a perspective view showing an inner appearance of a foldable portable telephone incorporating the light transmission module. FIG. 22 is a block diagram of a portion applied with the light transmission module in the foldable portable telephone incorporating the light transmission module.

A light transmission module 100 is configured by a light transmission processing unit 2 with a light source drive circuit (light emission drive portion) and a light emitting portion (light emitting element; VCSEL (Vertical Cavity-Surface Emitting Laser)) connected to a master side board (main control board) 20 mounted with a CPU 29; a light reception processing unit 3 with a light receiving portion (light receiving element; PD (Photo-Diode) and a reception (amplifier) IC connected to a slave side board (application circuit board) 30 mounted with various types of applications such as an LCD (Liquid Crystal Display), an LCD driver 39 for drive controlling the LCD, and a camera module; and a light transmission path 4 for transmitting an optical signal by connecting the light transmission processing unit 2 and the light reception processing unit 3, such as an optical fiber or a light guide having high bendability.

The mechanism of light transmission in the light transmission module 100 will now be briefly described. First, the light emission drive portion drives the light emission of the light emitting portion based on an electrical signal input from a main control board 20, and the light emitting portion irradiates a light incident surface of the light transmission path 4 with light. The light applied to the light incident surface of the light transmission path 4 is introduced into the light transmission path 4, and exit from a light exit surface of the light transmission path 4. The light exit from the light exit surface of the light transmission path 4 is received by the light receiving portion and converted to an electrical signal. The converted electrical signal is amplified to a desired value by an amplifier, and input to the LCD driver 39 and the like of the application circuit board 30.

The use of such light transmission module enables high speed and large capacity data transmission from the main control board mounted in the portable telephone to the application circuit board. Thus, the light transmission module excels as a data transmission module.

The light transmission module has an advantage in that large capacity data can be transmitted at high speed, but has a drawback in that the power consumption is large compared to the electrical transmission module for transmitting small capacity data at low speed. Thus, in spreading the light transmission module in the future, it is important to reduce the power consumption in the light transmission module, in particular, in a light transmission processing unit and a light reception processing unit.

To reduce the power consumption of the light transmission processing unit and the light reception processing unit, start and stop of the light transmission processing unit and the light reception processing unit are controlled according to the presence of data (transmitting data) transmitted between the units. The configuration shown in FIG. 23 and the configuration of patent document 1 shown in FIG. 24 are illustrated by way of example.

FIG. 23 is a block diagram showing a schematic configuration of a portable telephone including a light transmission module showing a technique conventionally used in general for controlling start and stop of the light transmission processing unit and the light reception processing unit. As shown in the figure, in the conventional technique, start and stop of a light transmission processing unit (Tx) 2 and a light reception processing unit (Rx) 3 are individually controlled based on a control signal input from the CPU 29 and a CPU (not shown) on the data reception side. Specifically, the CPU 29 on the data transmission side detects the presence of an input signal (data signal) to the light transmission processing unit 2 and controls the start and stop of the light transmission processing unit 2, and the CPU on the data reception side detects the presence of an output signal (data signal) from the light reception processing unit 3 and controls the start and stop of the light reception processing unit 3.

FIG. 24 is a block diagram showing a schematic configuration of the light transmission module including a light reception circuit disclosed in patent document 1. As shown in the figure, such light transmission module includes a signal detection circuit 35 for determining whether or not the light receiving portion 31 received the optical signal, and a power supply controller 34 for controlling the power supply of an amplifier 32 and an I/F circuit 33 based on the detection result of the signal detection circuit 35. The power supply controller 34 stops the power supply of the amplifier 32 and the I/F circuit 33 if the light receiving portion 31 has not received the optical signal, and the power supply controller 34 starts the power supply of the amplifier 32 and the I/F circuit 33 if the light receiving portion 31 has received the optical signal. In the light transmission processing unit 2, the power supply in the I/F circuit 21, the light emission drive portion 22, and the light emitting portion 23 can be controlled by the control signal input to the power supply controller 25 from the CPU (not shown) arranged outside.

According to such conventional techniques, the power consumption of the light transmission module can be reduced since start and stop of the light transmission processing unit and the light reception processing unit can be controlled according to the presence of the input signal (data signal).

Patent document 1: Japanese Unexamined Patent Publication No. 2004-135188 (date of publication: Apr. 30, 2004).

DISCLOSURE OF THE INVENTION

In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

First, in the technique of individually controlling the start and the stop of the light transmission processing unit and the light reception processing unit, the control of the start and the stop of the light transmission processing unit 2 and the light reception processing unit 3 are individually performed and synchronization thereof cannot be taken, and thus the light reception processing unit 3 might be operating in a reception standby (waiting) state even if the light transmission processing unit 2 is in the stopped state. Thus, the light reception processing unit 3 is in the operating state and the power in the light transmission processing unit 3 is wastefully consumed although data transmission is not performed. Therefore, the power consumption in a case where the light transmission module is in the standby state cannot be suppressed.

In the technique of patent document 1, whether or not the light receiving portion 31 has received the optical signal is detected by the signal detection circuit 35, and thus the light receiving portion 31, the signal detection circuit 35, and the power supply controller 34 need to be constantly started even if the amplifier 32 and the I/F circuit 33 are in the stopped state. Thus, the power in time of standby in the stopped state is consumed, and the power consumption in the case where the light transmission module is in the standby state cannot be suppressed, similar to the above technology.

One or more embodiments of the present invention provides a light transmission module capable of reducing the power consumption in time of standby with a simple configuration, and an electronic device.

One or more embodiments of the present invention the present invention provides a light transmission module including a light transmitting unit with a light emitting portion for outputting an optical signal corresponding to a data signal input as an electrical signal and a first power supply controller for controlling a drive power supply of the light emitting portion, a light transmission path for transmitting the optical signal introduced from the light transmitting unit, and a light receiving unit with a light receiving portion for receiving the optical signal output from the light transmission path and outputting an electrical signal corresponding to the optical signal and a second power supply controller for controlling a drive power supply of the light receiving portion; the light transmission module including: at last one electrical transmission path, connecting the light transmitting unit and the light receiving unit, for transmitting a control signal for controlling power supply to the light emitting portion and the light receiving portion to the first power supply controller and the second power supply controller; wherein the first power supply controller and the second power supply controller control the power supply to the light emitting portion and the light receiving portion based on the control signal input via the electrical transmission path.

According to the above configuration, the light transmitting unit and the light receiving unit are connected by the light transmission path for transmitting the data signal and the electrical transmission path for transmitting the control signal. The control signal is input to the first power supply controller for controlling the drive power supply of the light emitting portion and the second power supply controller for controlling the drive power supply of the light receiving portion via the electrical transmission path, and the power supply to the light emitting portion and the light receiving portion is controlled based on the input control signal.

Therefore, the start and the stop of the light emitting portion and the light receiving portion can be controlled with the same control signal. Specifically, when the control signal commanding the stop of the power supply to the light emitting portion and the light receiving portion in the drive state is input to the first power supply controller and the second power supply controller, the power supply to the light emitting portion is stopped by the first power supply controller, and the power supply to the light receiving portion is stopped by the second power supply controller, whereby the light emitting portion and the light receiving portion make the transition from the drive state to the stopped state. When the control signal commanding the start of the power supply to the light emitting portion and the light receiving portion in the stopped state is input to the first power supply controller and the second power supply controller, the power supply to the light emitting portion is started by the first power supply controller, and the power supply to the light receiving portion is started by the second power supply controller, whereby the light emitting portion and the light receiving portion make the transition from the stopped state to the drive state.

Therefore, a state in which either one of the light emitting portion and the light emitting portion is driven or stopped can be avoided since the power supply to the light emitting portion and the light receiving portion can be controlled with the same control signal. For instance, if the light emitting portion is in the stopped state, the light receiving portion is also in the stopped state. Thus, when the light emitting portion is in the stopped state, the power consumed by the light receiving portion can be reduced while waiting for the reception of the data signal transmitted from the light transmitting unit.

In the above-described configuration of the light transmission module according to one or more embodiments of the present invention, the second power supply controller may control the power supply to the light receiving portion based on the control signal input via the electrical transmission path from the light transmitting unit.

According to such configuration, the control signal is transmitted in a direction same as a direction the data signal is transmitted. Thus, using the portable telephone mounted with the light transmission module by way of example, when the CPU mounted on the main control board in the portable telephone outputs the control signal to stop the power supply to the light emitting portion and the light receiving portion of the light transmission module after performing the transmission process of the data signal to the light transmission module, the control signal is input to the first power supply controller and the second power supply controller via the electrical transmission path of the light transmission module, Thus, the power supply to the light emitting portion and the light receiving portion can be stopped immediately after the transmission/reception process of the data signal in the light transmission module is completed, whereby wasteful power consumption can be suppressed.

In the above-described configuration of the light transmission module according to one or more embodiments of the present invention, the first power supply controller may control the power supply to the light emitting portion based on the control signal input via the electrical transmission path from the light receiving unit.

According to such configuration, the control signal is transmitted in a direction opposite to a direction the data signal is transmitted. In other words, using the portable telephone mounted with the light transmission module by way of example, the image data (data signal) imaged by the camera is reception-processed by the CPU mounted on the main control board via the light transmission module. The control signal is then output from the CPU and input to the first power supply controller via the electrical transmission path. Thus, the above-described configuration enables the transmission of the control signal to the first power supply controller and the second power supply control regardless of a transmission direction of the data signal and the control of the power supply to the light emitting portion and the light receiving portion, and thus application can be made as a light transmission module enabling bi-directional communication.

In the above-described configuration of the light transmission module according to one or more embodiments of the present invention, the light transmitting unit may further include a signal determination processing means for determining whether or not the data signal is input to the light transmitting unit and outputting the control signal to the first power supply controller and the second power supply controller based on the determination result; and the signal determination processing means may input a control signal for stopping the power supply to the light emitting portion and the light receiving portion to the first power supply controller and the second power supply controller via the electrical transmission path when determined that the data signal is not input to the light transmitting unit, and may input a control signal for starting the power supply to the light emitting portion and the light receiving portion to the first power supply controller and the second power supply controller via the electrical transmission path when determined that the data signal is input to the light transmitting unit.

According to such configuration, the control signal corresponding to the presence of the data signal input to the light transmitting unit is input to the first power supply controller and the second power supply controller. Thus, the power supply to the light emitting portion and the light receiving portion can be stopped immediately after determining that the data signal is not present, whereby wasteful consumption of the standby power can be suppressed.

In the above-described configuration of the light transmission module according to one or more embodiments of the present invention, the light transmitting unit may receive the control signal from a transmission source side of the data signal and input the control signal to the first power supply controller and output the control signal to the electrical transmission path; and the light receiving unit may receive the control signal transmitted via the electrical transmission path, and input the control signal to the second power supply controller.

According to such configuration, when the control signal is input from the outside the light transmission module, the output control signal is input to the first power supply controller and the second power supply controller. Thus, since the presence of the input signal does not need to be determined in the light transmission module, the light transmission module itself can be miniaturized and the manufacturing cost can be reduced. The light transmission module of such configuration is suitable for a configuration in which the CPU etc. arranged exterior to the light transmission module determines the presence of the input signal to the light transmission module and performs the power supply control in the light transmission module.

In the above-described configuration of the light transmission module according to one or more embodiments of the present invention, the light receiving unit may receive the control signal transmitted via the electrical transmission path, and input the control signal to the second power supply controller and outputs the control signal to the outside.

Conventionally, the control signal is transmitted by directly connecting the CPU mounted on the main control board and the application circuit in order to start or stop the power supply of the application circuit mounted on the application circuit board. The signal line for control signal transmission is thus necessary apart from the light transmission module, which led to increase in the wiring space.

In the above-described configuration, on the other hand, the control signal is transmitted to the first power supply controller and the second power supply controller 4, and the application circuit mounted on the application circuit board using the electrical transmission path integrally configured with the light transmission module, and the power supply of the light transmission module and the application circuit is controlled. The wiring space thus can be saved, and the light transmission module can be applied to a smaller device.

In the above-described configuration of the light transmission module according to one or more embodiments of the present invention, a high input impedance circuit may be arranged between a branched portion of the electrical transmission path connected to the light receiving unit and the electrical transmission path connected to the first power supply controller, and the first power supply controller on the electrical transmission path so that the first power supply controller may become high impedance when seen from the electrical transmission path.

Generally, when transmitting the electrical signal at high speed, the transmitted high frequency signal (RF signal) is susceptible to other circuits, and bluntness occurs in the signal waveform. Thus, a so-called impedance matching in which the signal is not transmitted as a normal signal arises cannot be realized.

In this regards, according to the above-described configuration, the input impedance of the first power supply controller that influences the signal waveform becomes high. The bluntness of the waveform of the high frequency signal thus can be prevented, and the control signal can be transmitted at high speed as a normal signal. A specific example of the high input impedance circuit is an inverter circuit that uses a MOS transistor for the input unit.

In the above-described configuration of the light transmission module according to one or more embodiments of the present invention, the light transmitting unit may receive an input signal of the data signal and the control signal from respective transmission source via the same transmission path; the light transmitting unit may further include a signal separating means for separating the received input signal to one of the data signal and the control signal; and the signal separating means inputs the data signal to the light receiving portion while inputting the control signal to the first power supply controller and the second power supply controller via the electrical transmission path.

According to the above configuration, the data signal and the control signal can be separated, and thus the transmission path for transmitting the data signal and the transmission path for transmitting the control signal connected to the light transmission module from the outside can be configured with the same transmission path. Thus, the number of transmission paths connected to the light transmission module can be reduced, whereby the light transmission module can be applied to a smaller device.

In the above-described configuration of the light transmission module according to one or more embodiments of the present invention, the signal separating means may be configured by a high-pass filter and a low-pass filter; the high-pass filter is arranged on the transmission path connected to the light emitting portion, the input signal passed through the high-pass filter being input to the light emitting portion; the low-pass filter may be arranged on the electrical transmission path connected to the first power supply controller and the second power supply controller, the input signal passed through the low-pass filter being input to the first power supply controller and the second power supply controller via the electrical transmission path.

In the above-described configuration of the light transmission module according to one or more embodiments of the present invention, the high input impedance circuit may be arranged between the branched portion and the low-pass filter, the branched portion being arranged between the electrical transmission path connected to the low-pass filter, on which the control signal is transmitted and the transmission path and the electrical transmission path connected to the light emitting portion, on which the data signal is transmitted, so that the electrical transmission path on which the control signal is transmitted may become high impedance when seen from the transmission path on which the data signal is transmitted.

When the data signal is the high frequency (RF) signal of greater than or equal to a several hundred MHz band, the signal is less susceptible to the impedance of the electrical transmission path on the low speed side, and the waveform bluntness occurs.

In this regards, according to the above configuration, the high input impedance circuit is arranged such that the electrical transmission path becomes high impedance when seen from the data signal. The data signal of the RF band thus can be accurately transmitted to the light transmitting unit. A specific example of the high input impedance circuit is an inverter circuit that uses a MOS transistor for the input unit.

In the above-described configuration of the light transmission module according to one or more embodiments of the present invention, the signal separating means may be configured by a first voltage comparison means for comparing a voltage level of the input signal and a first voltage value set in advance, and a second voltage comparison means for comparing the voltage level of the input signal and a second voltage value set in advance; the first comparison means may be arranged on the transmission path connected to the light emitting portion, the input signal being input to the light emitting portion if the first voltage value is in a range of change of the voltage level of the input signal; and the second comparison means may be arranged on the electrical transmission path connected to the first power supply controller and the second power supply controller, the input signal being input to the first power supply controller and the second power supply controller via the electrical transmission path if the second voltage value is in a range of change of the voltage level of the input signal.

In the above-described configuration of the light transmission module according to one or more embodiments of the present invention, the signal separating means may be configured by a frequency determining means for detecting a frequency of the input signal and comparing the detected frequency and a frequency set in advance, and a switching means for switching a transmission direction of the input signal by a switch based on the result determined by the frequency determining means; the switching means may switch the switch to transmit the input signal to the transmission path connected to the light emitting portion when the frequency determining means determines that the frequency of the input signal is greater than the frequency set in advance while switching the switch to transmit the input signal to the electrical transmission path connected to the first power supply controller and the second power supply controller when the frequency determining means determines that the frequency of the input signal is smaller than the frequency set in advance.

In the above-described configuration of the light transmission module according to one or more embodiments of the present invention, the signal separating means may be configured by a voltage comparison means for detecting a voltage level of the input signal and comparing the detected voltage level and a voltage level set in advance, and a switching means for switching a transmission direction of the input signal by a switch based on the result compared by the voltage comparison means; the switching means may switch the switch to transmit the input signal to the transmission path connected to the light emitting portion when the voltage comparison means determines that the voltage level of the input signal is greater than the voltage level set in advance while switching the switch to transmit the input signal to the electrical transmission path connected to the first power supply controller and the second power supply controller when the voltage comparison means determines that the voltage level of the input signal is smaller than the voltage level set in advance.

In the above-described configuration of the light transmission module according to one or more embodiments of the present invention, the electrical transmission path may include a flexible printed circuit board.

In the above-described configuration of the light transmission module according to one or more embodiments of the present invention, the electrical transmission path may include a coaxial cable.

Other objects, advantages, and excelling aspects of the present invention can be recognized from the following description. The advantages of the present invention will become apparent from the following description with reference to the accompanied drawings.

Figure 1:
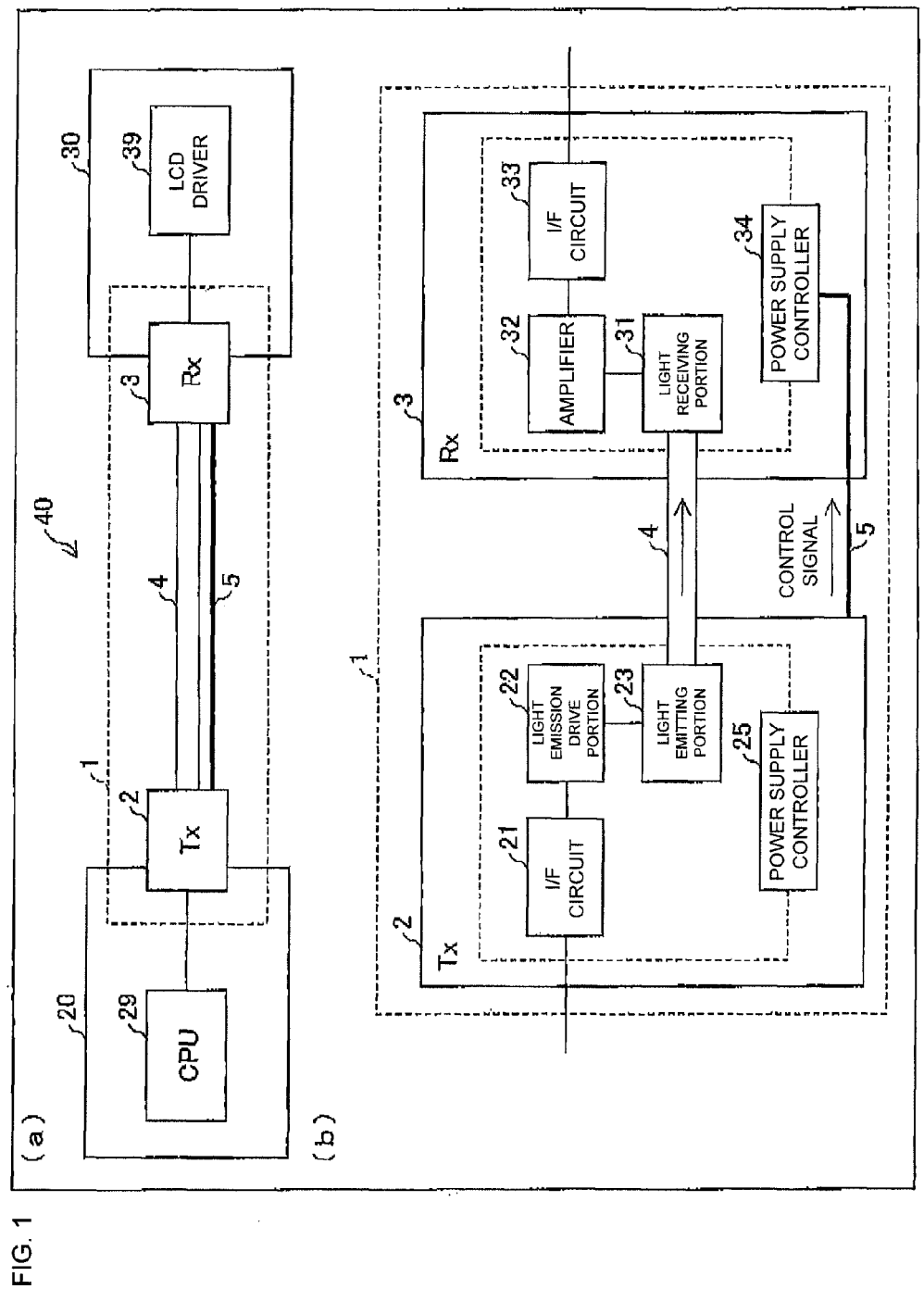
FIG. 1(a) is a block diagram showing a portion applied with a light transmission module in a foldable portable telephone incorporating the light transmission module of the present embodiment.
FIG. 1(b) is a block diagram schematically showing the light transmission module.

DESCRIPTION OF SYMBOLS 1 light transmission module
2 light transmission processing unit (light transmitting unit)
23 light emitting portion
24 signal determination processing portion (signal determination processing means)
25 power supply controller (first power supply controller)
27 signal separator (signal separating means)
271a HPF (high-pass filter)
271b LPF (low-pass filter)
272a first voltage comparison circuit (first voltage comparison means)
272b second voltage comparison circuit (second voltage comparison means)
275 voltage comparison circuit (voltage comparison means)
273 frequency determining portion (frequency determining means)
274 switching portion (switching means)
3 light reception processing unit (light receiving unit)
31 light receiving portion
34 power supply controller (second power supply controller)
4 light transmission path
5 electrical transmission path
20 main control board
30 application circuit board

BEST MODE FOR CARRYING OUT THE INVENTION

First Embodiment

One embodiment of the present invention will be described below based on FIG. 3 to FIG. 8.

In a first embodiment and a second embodiment, to be hereinafter described, a configuration of a foldable portable telephone (hereinafter referred to as portable telephone) including a main body with operation keys, a lid with a display screen, and a hinge for rotatably connecting the main body and the lid, where information (data) transmission between the main body and the lid is carried out through a light transmission module arranged in the hinge will be described by way of example.

FIG. 3(a) is a perspective view showing an outer appearance of a portable telephone 40 incorporating a light transmission module 1 of the first embodiment. FIG. 3(b) is a block diagram of a portion applied with the light transmission module 1 in the portable telephone 40 shown in FIG. 3(a). FIG. 3(c) is a perspective plan view of a hinge 41 (portion surrounded with a broken line) in FIG. 3(a).

As shown in FIGS. 3(a) to 3(c), the foldable portable telephone 40 is configured by a body unit 42, a hinge 41 arranged at one end of the body unit 42, and a lid 43 rotatably arranged with the hinge 41 as a shaft.

The body unit 42 includes an operation key 44 for operating the portable telephone 40, and interiorly includes a main control board 20. The main control board 20 is mounted with a CPU 29 for comprehensively controlling each element (not shown) mounted on the main control board 20.

The lid 43 exteriorly includes a display screen 45 and a camera (not shown) and interiorly includes an application circuit board 30. The application circuit board 30 is mounted with an LCD (Liquid Crystal Display) (not shown) for displaying images based on the image data transferred from the CPU 29, an LCD driver 39 for drive controlling the LCD, a camera module 38 including a camera for imaging a subject, and a camera drive portion for drive controlling the camera, and the like.

The light transmission module 1 connects the main control board 20 and the application circuit board 30, and carries out data transmission between the boards 20, 30. Specific examples of the data transmitted from the main control board 20 to the application circuit board 30 include drive signals for driving the LCD driver 39 and the camera module 38, and image data to be displayed on the LCD. Specific examples of the data transmitted from the application circuit board 30 to the main control board 20 include image data imaged by the camera.

Configuration of Light Transmission Module

FIG. 4(a) is a block diagram of a portion applied with the light transmission module 1 in the portable telephone 40 incorporating the light transmission module 1 of the first embodiment, and FIG. 4(b) is a block diagram showing a schematic configuration of the light transmission module 1.

As shown in the figure, the light transmission module 1 includes a light transmission processing unit (light transmitting unit; Tx) 2 connected to the main control board 20 mounting the CPU 29, a light reception processing unit (light receiving unit; Rx) 3 connected to the application circuit board 30 mounting the application circuit such as the LCD driver 39 and the camera module 38, a light transmission path 4 acting as an optical wiring for connecting the light transmission processing unit 2 and the light reception processing unit 3, and an electrical transmission path 5 acting as an electrical wiring for connecting the light transmission processing unit 2 and the light reception processing unit 3.

The light transmission processing unit 2 includes an interface circuit (hereinafter referred to as I/F circuit) 21, a light emission drive portion 22, a light emitting portion 23, a signal determination processing portion (signal determination processing means) 24, and a power supply controller (first power supply controller) 25.

The I/F circuit 21 is a circuit for receiving signals having different voltage levels and frequency levels from the outside, and is arranged between the electrical wiring for the electrical signal externally input to the light transmission module 1 and the light emission drive portion 22. Although not illustrated, the I/F circuit 21 includes an electrical connecting portion with respect to the electrical wiring for transmitting the externally input electrical signal.

The light emission drive portion 22 drives the light emission of the light emitting portion 23 based on the electrical signal externally input to the light transmission module 1 through the I/F circuit 21. The light emission drive portion 22 is configured by a light emission drive IC (Integrated Circuit), and the like.

The light emitting portion 23 emits light based on the drive control by the light emission drive portion 22. The light emitting portion 23 is configured by a light emitting element such as a VCSEL (Vertical Cavity-Surface Emitting Laser). The light incident side end of the light transmission path 4 is irradiated with the light emitted from the light emitting portion 23 as an optical signal.

The signal determination processing portion 24 determines the presence of the signal output from the main control board 20, and outputs a control signal corresponding to the determination result. The details of the signal determination processing portion 24 will be hereinafter described.

The power supply controller 25 comprehensively controls the power supply of each portion configuring the light transmission processing unit 2 based on the control signal output from the signal determination processing portion 24. Specifically, the power supply controller 25 supplies power to the I/F circuit 21, the light emission drive portion 22, and the light emitting portion 23 to drive them, while shielding the supply of power to the I/F circuit 21, the light emission drive portion 22, and the light emitting portion 2 and stops the same based on the control signal.

The light transmission processing unit 2 converts the electrical signal input to the light transmission processing unit 2 to the optical signal corresponding to the electrical signal and outputs the optical signal to the light transmission path 4, and has the power supply of each portion configuring the interior thereof controlled by the power supply controller 25.

The light reception processing unit 3 includes a light receiving portion 31, an amplifier 32, an I/F circuit 33, and a power supply controller 34.

The light receiving portion 31 receives the light serving as the optical signal exit from the light exit side end of the light transmission path 4, and outputs the electrical signal by photoelectric conversion. The light receiving portion 31 is configured by a light receiving element such as a PD (Photo-Diode).

The amplifier 32 amplifies the electrical signal output from the light receiving portion 31 to a desired value, and outputs the desired value to the outside. The amplifier 32 is configured by an amplification IC, and the like.

The I/F circuit 33 is a circuit for outputting the electrical signal amplified by the amplifier 32 to the outside of the light transmission module 1, and is arranged between the amplifier 32 and the electrical wiring connecting to the outside of the light transmission module 1. Although not illustrated, the I/F circuit 33 includes an electrical connecting portion with respect to the electrical wiring for transmitting the input electrical signal to the outside.

The power supply controller 34 receives the control signal output from the signal determination processing portion 24 of the light transmission processing unit 2 through the electrical transmission path 5, to be hereinafter described, and comprehensively controls the power supply of each portion configuring the light reception processing unit 3 based on the control signal. Specifically, the power supply controller 34 supplies power to the light receiving portion 31, the amplifier 32, and the I/F circuit 33 to drive them, while shielding the supply of power to the light receiving portion 31, the amplifier 32, and the I/F circuit 33 and stops the same.

The light reception processing unit 3 thus receives the optical signal output from the light transmission path 4, converts the same to the electrical signal corresponding to the optical signal, amplifies the same to a desired signal value and outputs the desired value to the outside, and has the power supply of each portion configuring the interior thereof controlled by the power supply controller 34.

The light transmission path 4 is a medium for transmitting the optical signal serving as data signal emitted from the light emitting portion 23 to the light receiving portion 31, and the electrical transmission path 5 is a medium for transmitting the electrical signal serving as the control signal output from the light transmission processing unit 2 to the light reception processing unit 3. The details of the light transmission path 4 and the electrical transmission path 5 will be hereinafter described in detail.

Configuration of Light Transmission Path

The details of the light transmission path 4 will be described using FIG. 5(a) and FIG. 5(b). FIG. 5(a) shows a side view of the light transmission path 4. As shown in the figure, the light transmission path 4 has a configuration including a column-shaped core 4a having a light transmission direction as an axis, and a clad 4b arranged to surround the periphery of the core 4a. The core 4a and the clad 4b are made of materials having translucency, where the index of refraction of the core 4a is higher than the index of refraction of the clad 4b. The optical signal that entered the core 4a is transmitted in the light transmission direction by being totally reflected repeatedly inside the core 4a.

Glass, plastic, or the like may be used for the material for forming the core 4a and the clad 4b, but resin material of acryl series, epoxy series, urethane series, silicone series and the like is preferably used to form the light transmission path 4 having sufficient flexibility. The clad 4b may be made of gas such as air. Furthermore, similar effects can be obtained even if the clad 4b is used under a liquid atmosphere having smaller index of refraction than the core 4a.

A mechanism of light transmission by the light transmission path 4 will be described using FIG. 5(b). FIG. 5(b) schematically shows a state of light transmission in the light transmission path 4. As shown in the figure, the light transmission path 4 is configured by a column-shaped member having flexibility. A light incident surface 4A is provided on the light incident side end of the light transmission path 4, and a light exit surface 4B is provided on the light exit side end.

The light emitted from the light emitting portion 23 enters the light incident side end of the light transmission path 4 from a direction perpendicular to or substantially perpendicular to the light transmission direction of the light transmission path 4. The incident light is introduced into the light transmission path 4 by being reflected at the light incident surface 4A and advances through the core 4a. The light that advanced through the light transmission path 4 and reached the light exit side end is reflected at the light exit surface 4B and exit in a direction perpendicular to or substantially perpendicular to the light transmission direction of the light transmission path 4. The light receiving portion 31 is irradiated with the exit light, and the exit light is photoelectric converted in the light receiving portion 31.

According to such configuration, the light emitting portion 23 serving as a light source can be arranged in a direction perpendicular to or substantially perpendicular to the light transmission direction in the light transmission path 4. Thus, when the light transmission path 4 needs to be arranged parallel to the substrate surface, the light emitting portion 23 is installed between the light transmission path 4 and the substrate surface so as to emit light in a normal direction of the substrate surface. Such configuration facilitates mounting and enables further miniaturization in configuration than the configuration of installing the light emitting portion 23 so as to emit light parallel to the substrate surface. This is because the general configuration of the light emitting portion 23 is such that a size in a direction perpendicular to a direction of emitting light is larger than the size in a direction of emitting light. Furthermore, application can be made to a configuration of using a plane mounting light emitting element in which the electrode and the light emitting portion 23 are in the same plane.

The light transmission path 4 shown in the figure has a configuration in which the light incident surface 4A and the light exit surface 4B are inclined, as described above, but the light transmission path 4 in the present embodiment may have a configuration in which both end surfaces are orthogonal to the light transmission direction. In other words, the outer shape of the light transmission path 4 may be formed to a solid rectangular shape.

Configuration of Signal Determination Processing Portion

The details of the signal determination processing portion 24 will be described below. The signal determination processing portion 24 is connected to the I/F circuit 21, and determines the presence of the electrical signal (input signal) externally input to the light transmission processing unit 2. The signal determination processing portion 24 outputs a signal (stop signal) commanding the stop of power supply to each portion to the power supply controller 25 of the light transmission processing unit 2 and the power supply controller 34 of the light reception processing unit 3 if determined that the input signal is not present, while outputting a signal (start signal) commanding the start of power supply to each portion to the power supply controllers 25, 34 if determined that the input signal is present. The signal determination processing portion 24 thus determines the presence of the input signal with respect to the light transmission module 1, and outputs the control signal, that is, a signal indicating start command or stop command based on the determination result.

A method the signal determination processing portion 24 determines the presence of the input signal in the light transmission processing unit 2 will be described below using two methods by way of example.

The first method is a method of reading change of "0" or "1" of the digital input signal. Specifically, the presence of the input signal is determined if "0" or "1" of the input signal does not change during the preset time, where determination is made that the input signal is not present if the input signal indicating "0" does not change during the preset time, and determination is made that the input signal is present if the input signal indicating "0" changed to "1" before elapse of the preset time. For instance, determination is made that the input signal is present if the input signal indicating "1" does not change during the preset time, and determination is made that the input signal is not present if the input signal indicating "1" changed to "0" before elapse of the preset time.

The second method is a method of reading voltage change of the input signal. Specifically, the presence of the input signal is determined by whether or not the voltage of the input signal is within the preset voltage range, where determination is made that the input signal is present if the voltage of the input signal is within the preset voltage range, and determination is made that the input signal is not present if the voltage of the input signal is outside the preset voltage range.

After determining the presence of the input signal through the above illustrated methods, the signal determination processing portion 24 outputs the control signal, specifically, the signal of "0" indicating the stop command or the signal of "1" indicating the start command to the power supply controllers 25, 34 in the light transmission processing unit 2 and the light reception processing unit 3, respectively. The respective power supply controllers 25, 34 controls the power supply of each portion of the light transmission processing unit 2 and the light reception processing unit 3 based on the control signal received from the signal discrimination processing unit 24.

Configuration of Electrical Transmission Path

The details of the electrical transmission path 5 will be described below. The electrical transmission path 5 is arranged parallel to the light transmission path 4, and connects the light transmission processing unit 2 and the light reception processing unit 3 to transmit the control signal output from the light transmission processing unit 2 to the light reception processing unit 3. Specifically, as shown in FIG. 4(b), the electrical light transmission path 5 connects the signal determination processing portion 24 and the power supply controller 25 of the light transmission processing unit 2 to the power supply controller 34 of the light reception processing unit 3, and transmits the control signal output from the signal determination processing portion 24 to the respective power supply controllers 25, 34.

Figure 6:
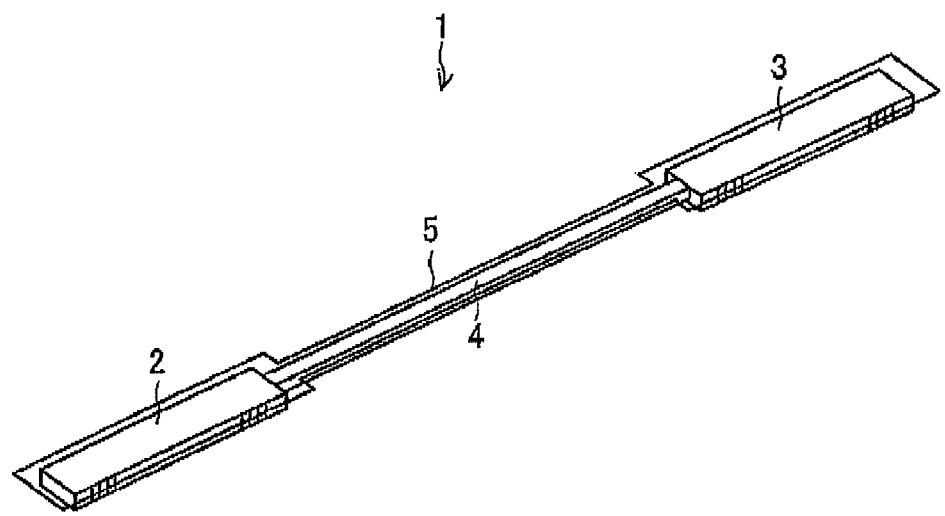
FIG. 6 is a perspective view showing a schematic configuration of a light transmission module when the electrical transmission path is configured by FPC.

The electrical transmission path 5 is specifically configured by a flexible printed circuit board (FPC), coaxial cable, lead frame, and the like. FIG. 6 is a perspective view showing a schematic configuration of the light transmission module 1 when the electrical transmission path 5 is configured by the FPC. The light transmission module 1 thus can be applied to a small electronic device such as a portable telephone by forming the light transmission path 4 and the electrical transmission path 5 with a flexible wiring.

Figure 7:
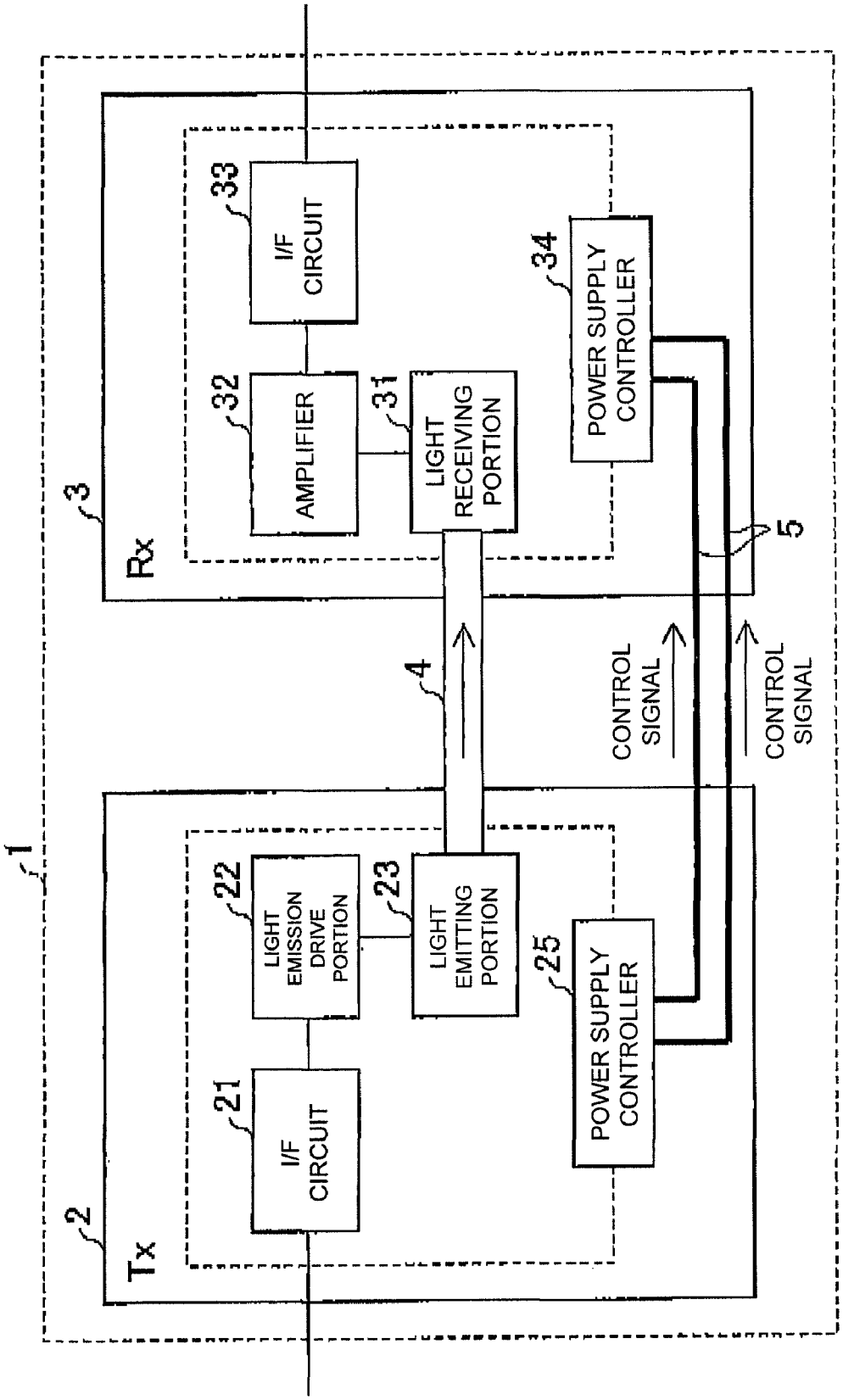
FIG. 7 is a block diagram showing a schematic configuration of the light transmission module when the electrical transmission path is configured by two signal lines.
Figure 8:
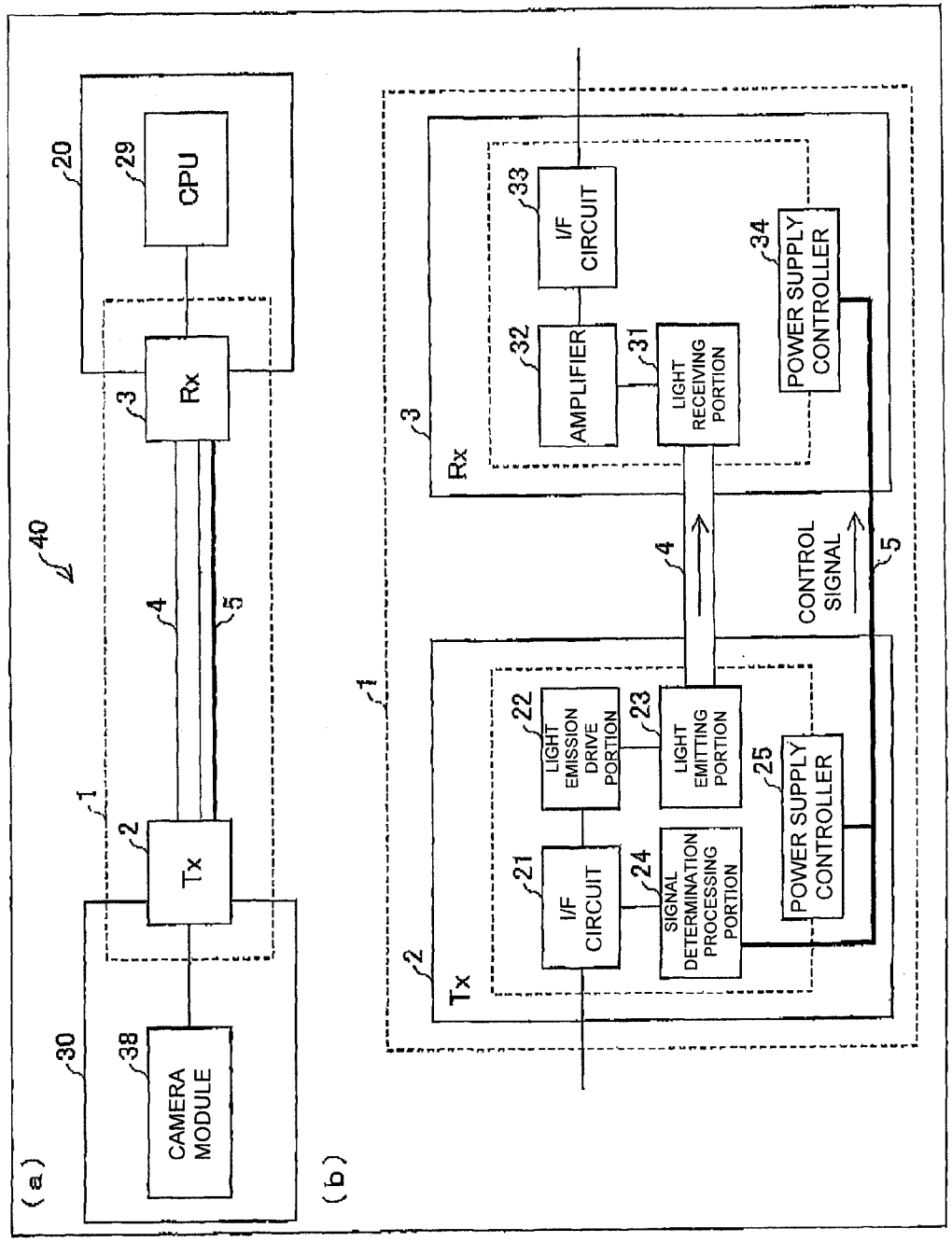
FIG. 8(a) is a block diagram of a portion applied with the light transmission module in the foldable portable telephone incorporating the light transmission module serving as a variant 1-1 in the first embodiment.
FIG. 8B is a block diagram showing a schematic configuration of the light transmission module.

The electrical transmission path 5 shown in FIG. 4(b) is configured by one signal line, but is not limited thereto, and may be formed by two or more signal lines. FIG. 7 is a block diagram showing a schematic configuration of the light transmission module 1 when the electrical transmission path 5 is configured by two signal lines. As shown in the figure, the two signal lines respectively connect the light transmission processing unit 2 and the light reception processing unit 3, and transmit the control signal to the respective power supply controllers 25, 34.

According to such configuration, the power state (power mode) in the light transmission processing unit 2 and the light reception processing unit 3 can be controlled to various states. Specifically, if the electrical transmission path 5 is configured by two signal lines, each electrical transmission path 5 can be controlled to the power mode corresponding to the combination of transmitting signal values ("0" or "1"), that is, four combinations of "00", "01", "10", "11". The setting and changes can be made to different power modes such as a stop mode in which the power of the light transmission processing unit 2 and the light reception processing unit 3 is completely shielded, a standby mode in which the power of the light transmission processing unit 2 and the light reception processing unit 3 is not completely shielded and a very small amount of standby power is supplied to enable high speed response process in time of activating, and a normal drive mode in which the power of the light transmission processing unit 2 and the light reception processing unit 3 is constantly supplied. The setting of the correspondence relationship of the control signal and the power mode is realized by a table (not shown).

Therefore, control is made to $2^n$ power modes by configuring the electrical transmission path 5 with n signal lines. A plurality of power modes can be controlled without using digital values of "0" and "1" by using one of the two signal lines as a clock signal line and the other signal line as a data signal line, and transmitting a command of 8 bits, 16 bits, or the like as a data signal.

The power supply controllers 25, 34 in the light transmission processing unit 2 and the light reception processing unit 3 that received the control signal via the electrical transmission path 5 change the light transmission processing unit 2 and the light reception processing unit 3 to the power mode corresponding to the control signal. For instance, when each of the power supply controllers 25, 34 receives the stop signal from the signal determination processing portion 24, the power supply of the I/F circuit 21, the light emission drive portion 22 and the light emitting portion 23 driven in the light transmission processing unit 2, and the light receiving portion 31, the amplifier 32, and the I/F circuit 33 driven in the light reception processing unit 3 is shielded to change from the drive mode to the stop mode. When each of the power supply controllers 25, 34 receives the start signal from the signal determination processing portion 24, the power supply to the I/F circuit 21, the light emission drive portion 22 and the light emitting portion 23 stopped in the light transmission processing unit 2, and the light receiving portion 31, the amplifier 32, and the I/F circuit 33 stopped in the light reception processing unit 3 is started for activating to change from the stop mode to the drive mode.

Therefore, the light transmission module 1 of the first embodiment has a configuration of controlling the power supply of the light transmission processing unit 2 and the light reception processing unit 3 based on the control signal output from the light transmission processing unit 2 or the data transmitting side. In particular, the power of the light reception processing unit 3 can be completely turned OFF if the data signal is not input to the light transmission module 1, whereby the power consumption in time of standby can be reduced compared to the conventional configuration. Furthermore, since the power supply in the light transmission processing unit 2 and the light reception processing unit 3 is controlled using the same signal line (electrical transmission path 5), the start/stop of both units can be simultaneously controlled, and wasteful power consumption due to the influence of time lag can be reduced.

Variant 1-1

A variant in which the light transmission module 1 of the present embodiment is applied to other configurations will now be described. FIG. 8(a) is a block diagram of a portion applied with the light transmission module 1 in the portable telephone 40 incorporating the light transmission module 1 serving as the variant 1-1 in the first embodiment, and FIG. 8B is a block diagram showing a schematic configuration of the light transmission module 1.

In the light transmission module 1 of the variant 1-1, the light transmission processing unit 2 and the light reception processing unit 3 of the light transmission module 4 shown in FIG. 4(a) and FIG. 4(b) have opposite configurations. That is, the light transmission processing unit 2 and the application circuit such as the camera module 38 are connected, and the light reception processing unit 3 and the CPU 29 are connected.

The flow of data signals and control signals transmitted in the light transmission module 1 of the variant 1-1 will be described.

The image data (data signal) imaged by the camera (camera module 38) is input to the I/F circuit 21 of the light transmission processing unit 2. In this case, the signal determination processing portion 24 determines that the input signal is present, and outputs a signal (start signal) commanding the start of the power supply to each unit configuring the light transmission module 1 to the power supply controllers 25, 34. The power supply controllers 25, 34 that received the start signal supply power to each unit and start the same. After being transmitted by the light reception processing unit 3 through the light transmission path 4, the image data is stored in the memory (not shown) by the process of the CPU 29. When determining that the input signal to be received next at the I/F circuit 21 is not present, the signal determination processing portion 24 outputs a signal (stop signal) commanding the stop of the power supply to each unit to the power supply controllers 25, 34. The power supply controllers 25, 34 that received the stop signal shield the power supply to each unit and change from the drive mode to the stop mode.

Thus, in the light transmission module 1 of the variant 1-1, the light transmission processing unit 2 has a configuration of receiving the data signal from the application circuit board 30 side mounted with the camera module 38, and outputting the control signal based on the received data signal. In other words, the flow of data signals and control signals in the light transmission module 1 in the variant 1-1 is configured opposite to the flow of data signals and control signals in the light transmission module 1 shown in FIG. 4(*a*) and FIG. 4(*b*). The light transmission module that can perform bi-directional communication can be realized by arranging the light transmission module shown in the figures as in FIG. 3(*b*).

Second Embodiment

Other embodiments of the present invention will be described below based on FIG. 9 to FIG. 18. For the sake of convenience of the explanation, same reference numerals are denoted for members having the same functions as the members shown in the first embodiment, and the description thereof will be omitted. The terms defined in the first embodiment are used according to such definition in the present embodiment unless otherwise specified.

Figure 9:
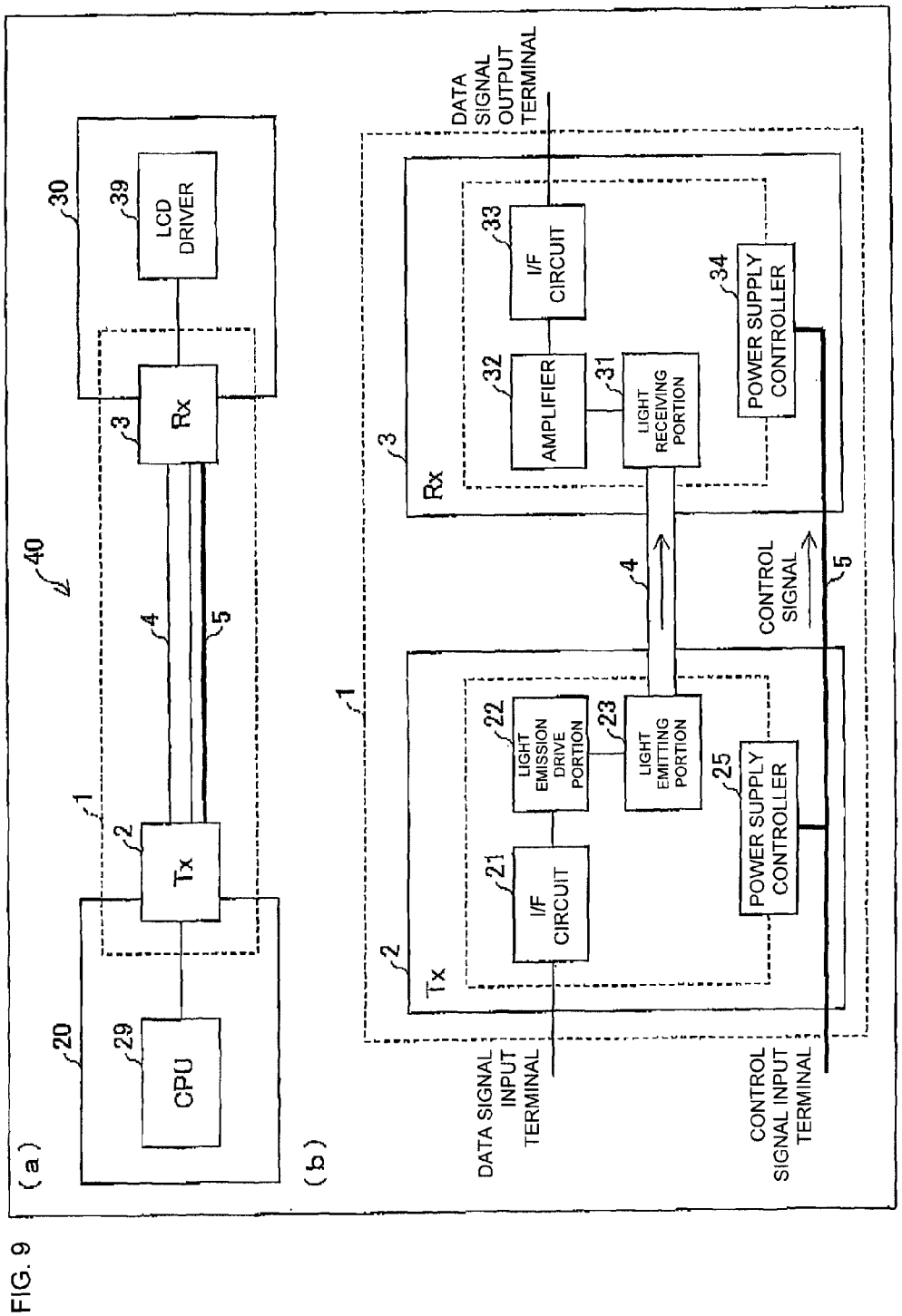
FIG. 9(a) is a block diagram of a portion applied with a light transmission module in the foldable portable telephone incorporating a light transmission module of a second embodiment.
FIG. 9(b) is a block diagram showing a schematic configuration of the light transmission module.

FIG. 9(*a*) is a block diagram of a portion applied with a light transmission module 10 in the portable telephone 40 incorporating the light transmission module 10 of the second embodiment, and FIG. 9(*b*) is a block diagram showing a schematic configuration of the light transmission module 10.

In the first embodiment, the signal determination processing portion 24 arranged in the light transmission processing unit 2 determines the presence of the input signal to the light transmission module 1, and outputs the control signal corresponding to the determination result to the power supply controller 25 and the power supply controller 34, but the control signal is received from outside the light transmission module 10 in the second embodiment. In other words, in the light transmission module 10, the power supply controller 25 of the light transmission processing unit 2 and the power supply controller 34 of the light reception processing unit 3 receive the control signal of the stop signal or the start signal generated outside, and control the light transmission processing unit 2 and the light reception processing unit 3 based on the received control signal.

As shown in FIG. 9(*a*) and FIG. 9(*b*), the light transmission processing unit 2 includes, apart from the input terminal (data signal input terminal) for receiving the data signal, an input signal (control signal input terminal) for receiving the control signal from the outside such as from the CPU 29 mounted on the main control board 20. In other words, the light transmission processing unit 2 and the CPU 29 are connected by the transmission path for data signal transmission and the transmission path for control signal transmission. The electrical transmission path 5 for transmitting the control signal is connected to the control signal input terminal, and the electrical transmission path 5 is connected to the respective power supply controllers 25, 34 of the light transmission processing unit 2 and the light reception processing unit 3.

According to the configuration of the second embodiment, the power of the light transmission processing unit 2 and the light reception processing unit 3 can be completely turned OFF when data is not input to the light transmission module 10, similar to the first embodiment, and thus the power consumption in time of standby can be reduced compared to the conventional configuration. Furthermore, since the power supply in the light transmission processing unit 2 and the light reception processing unit 3 is controlled using the same signal line (electrical transmission path 5) based on the control signal input to the light transmission module 10, the start/stop of both units can be simultaneously controlled, and wasteful power consumption due to the influence of time lag can be reduced.

The light transmission module 10 of the second embodiment is suitable when the CPU 29 arranged exterior to the light transmission module 10 determines the presence of the input signal to the light transmission module 10 and performs the power supply control in the light transmission module 10. Thus, the light transmission module 10 includes, at least, each configuring member for transmitting the optical signal, the electrical transmission path 5 for transmitting the control signal, and the power supply controllers 25, 34 for controlling the power supply based on the control signal. The miniaturization of the light transmission module 10 itself can be achieved, and the manufacturing cost can be reduced.

Variant 2-1

Figure 10:
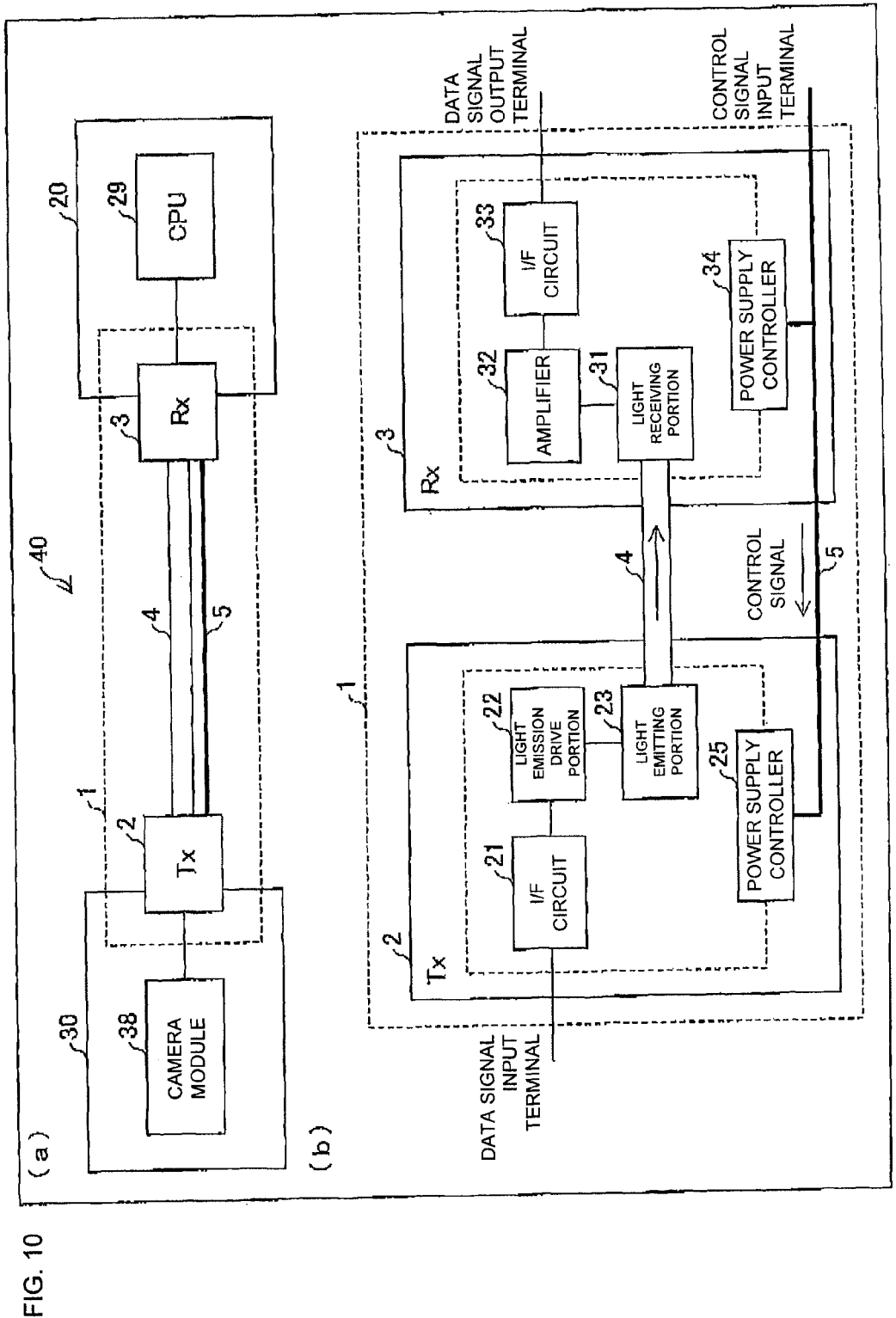
FIG. 10(a) is a block diagram of a portion applied with the light transmission module in the foldable portable telephone incorporating the light transmission module serving as a variant 2-1.
FIG. 10(b) is a block diagram showing a schematic configuration of the light transmission module.
Figure 11:
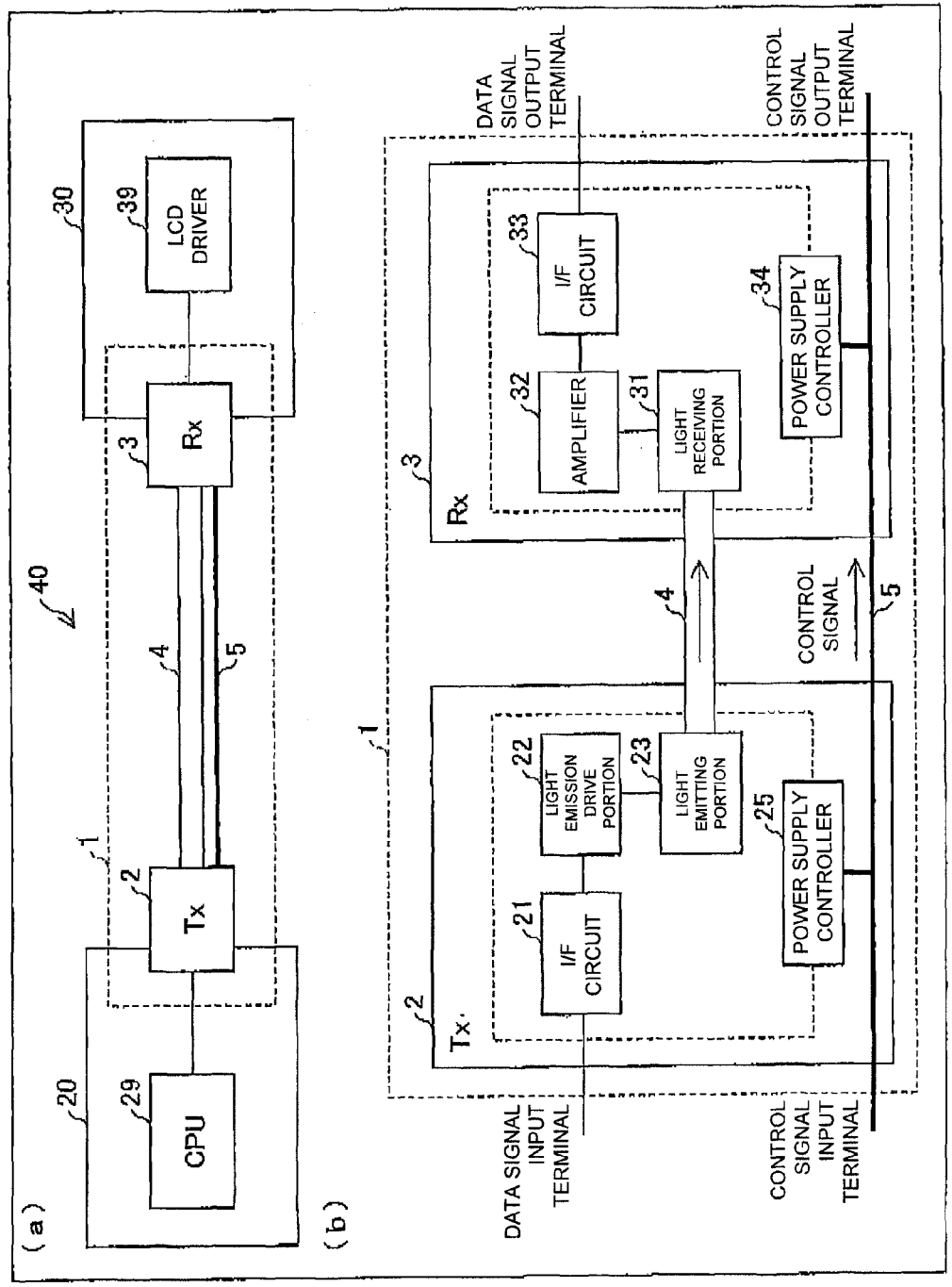
FIG. 11(a) is a block diagram of a portion applied with the light transmission module in the foldable portable telephone incorporating the light transmission module serving as a variant 2-2.
FIG. 11(b) is a block diagram showing a schematic configuration of the light transmission module.
Figure 12:
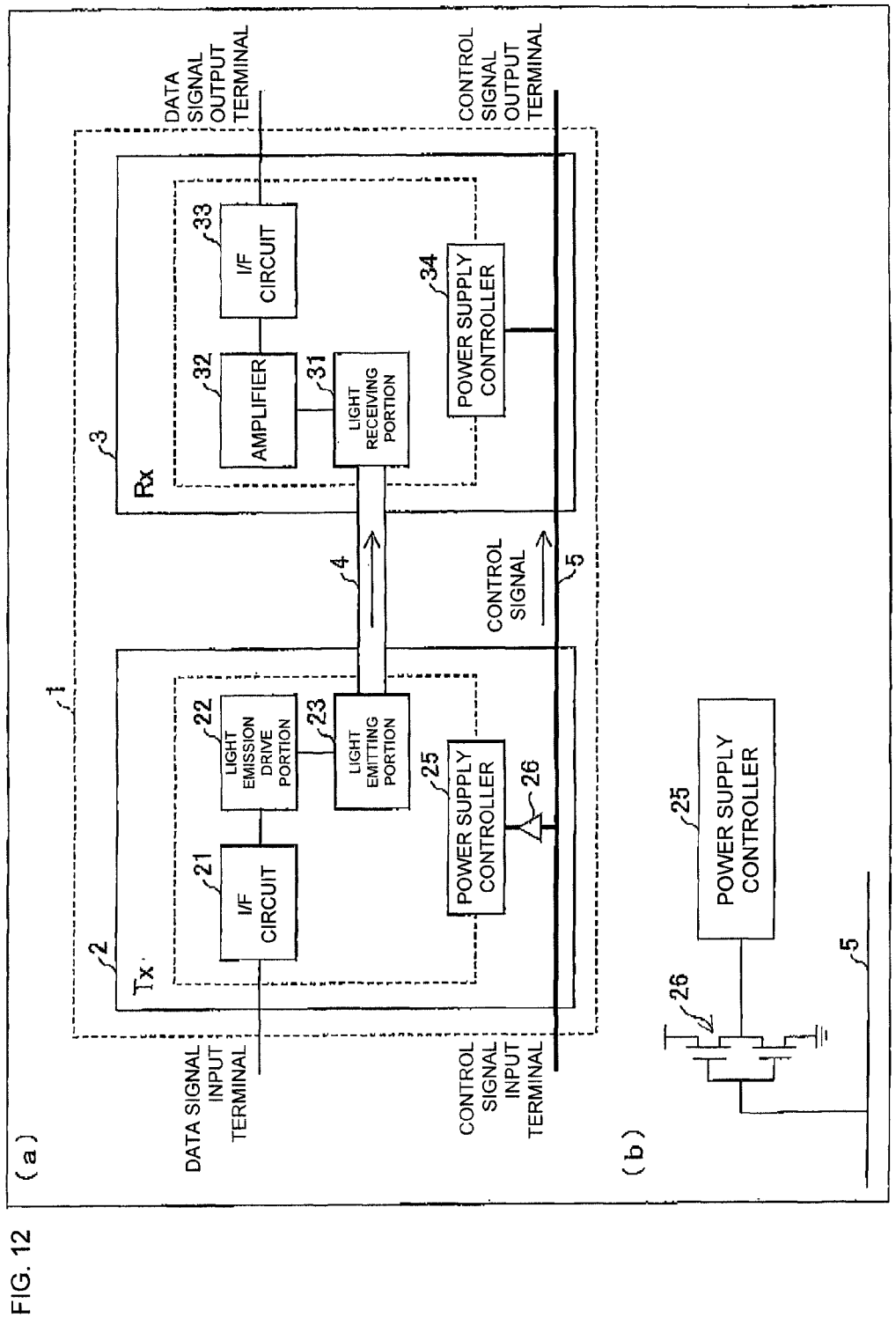
FIG. 12(a) is a block diagram showing a schematic configuration of the light transmission module serving as a variant 2-3.
FIG. 12(b) is a circuit diagram showing a configuration of a high input impedance circuit (circled portion).

A variant of the configuration shown in FIG. 9(*a*) and FIG. 9(*b*) will be described regarding the light transmission module 10 of the present embodiment. FIG. 10(*a*) is a block diagram of a portion applied with the light transmission module 10 in the portable telephone 40 incorporating the light transmission module serving as the variant 2-1, and FIG. 10(*b*) is a block diagram showing a schematic configuration of the light transmission module 10.

In the light transmission module 10 of the variant 2-1, the light transmission processing unit 2 and the light reception processing unit 3 of the light transmission module 10 shown in FIG. 9(*b*) have opposite configurations. That is, the light transmission processing unit 2 and the application circuit such as the camera module 38 are connected, and the light reception processing unit 3 and the CPU 29 are connected.

The flow of data signals and control signals transmitted in the light transmission module 10 of the variant 2-1 will be described.

For instance, the image data (data signal) imaged by the camera (camera module 38) is transmitted from the light transmission processing unit 2 to the light reception processing unit 3 via the light transmission path 4. The image data received by the light reception processing unit 3 is stored in the memory (not shown) by the process of the CPU 29. In the configuration of the variant 2-1, the CPU 29 outputs the control signal (e.g., stop signal) at the time point the image data transmitted from the main control board 20 is detected. The stop signal is input to the power supply controller 34 of the light reception processing unit 3 and input to the power supply controller 25 of the light transmission processing unit 2 via the electrical transmission path 5. When receiving the stop signal, the power supply controller 25 shields the power supply of the light receiving portion 31, the amplifier 32, and the I/F circuit 33 driven in the light reception processing unit 3 and the I/F circuit 21, the light emission drive portion 22, and the light emitting portion 23 driven in the light transmission processing unit 2, and changes from the drive mode to the stop mode.

In the configuration of the variant 2-1, the power supply controller 25 of the light transmission processing unit 2 receives the control signal output from the light reception processing unit 3 that receives the data signal, and controls the power supply of the light reception processing unit 2-3. According to such configuration, the light transmission module that can perform bi-directional communication can be realized by being simultaneously used with the light transmission module 10 shown in FIG. 9(b).

Variant 2-2

A variant of the configuration shown in FIG. 9(a) and FIG. 9(b) will be described regarding the light transmission module 10 of the present embodiment. FIG. 11(a) is a block diagram of a portion applied with the light transmission module 10 in the portable telephone 40 incorporating the light transmission module serving as the variant 2-2, and FIG. 11(b) is a block diagram showing a schematic configuration of the light transmission module 10.

In the example shown in FIG. 9(b), the electrical transmission path 5 in the light transmission module 10 is connected to the CPU 29 mounted on the main control board 30, the power supply controller 25 of the light transmission processing unit 2, and the power supply controller 34 of the light reception processing unit 3 through the control signal input terminal, but in the variant 2-2, the electrical transmission path 5 is further connected to the application circuit such as the LCD driver 39 mounted on the application circuit board 30.

Conventionally, the control signal is transmitted by directly connecting the CPU mounted on the main control board and the application circuit to start or stop the power supply of the application circuit mounted on the application circuit board. Thus, a control signal transmission signal line needed to be arranged separate from the light transmission module, which led to increase in wiring space.

In the configuration of the variant 2-2, on the other hand, the control signal output from the CPU 29 of the main control board 20 is simultaneously transmitted to the power supply controllers 25, 34 of the light transmission module 10 and the application circuit mounted on the application circuit board 30 using the electrical transmission path 5 that transmits the control signal for controlling the power supply, thereby simultaneously controlling the power supply of the light transmission module 10 and the application circuit. The wiring space thus can be saved and the light transmission module 10 can be applied to a smaller device.

In the configuration of the variant 2-2, the signal can be input/output to and from the outside at both end sides of the light transmission module 10, that is, the main control board 20 and the application circuit board 30, and thus the control signal output from the camera module 38 mounted on the application circuit board 30 can be transmitted to the CPU 29 of the main control board 20.

Variant 2-3

A variant of the configuration shown in FIG. 9(a) and FIG. 9(b) will be described regarding the light transmission module 10 of the present embodiment. FIG. 12(a) is a block diagram showing a schematic configuration of the light transmission module 10 serving as the variant 2-3, and FIG. 12(b) is a circuit diagram showing a configuration of a high input impedance circuit 26 (circled portion).

In the light transmission module 10 of the variant 2-3, a high input impedance circuit 26 is arranged between a branched portion 5a and the power supply controller 25, the branched portion 5a being arranged between the light reception processing unit 3 and the power supply controller 25, on the electrical transmission path 5 such that the power supply controller 25 of the light transmission processing unit 2 becomes high impedance when seen from the electrical transmission path 5.

Generally, when transmitting the electrical signal at high speed, the transmitted high frequency signal (RF signal) is susceptible to other circuits, and bluntness occurs in the signal waveform. Thus, a so-called impedance matching cannot be realized or the signal is not transmitted as a normal signal.

In the variant 2-3, the high input impedance circuit 26 is arranged such that the input impedance of the circuit that influences the signal waveform i.e., the power supply controller 25 herein becomes high. The bluntness of the waveform of the high frequency signal is thereby prevented, and the control signal can be transmitted at high speed as a normal signal. A specific example of the high input impedance circuit 26 is an inverter circuit that uses a MOS transistor for the input unit.

Variant 2-4

A variant of the configuration shown in FIG. 9(a) and FIG. 9(b) will be described regarding the light transmission module 10 of the present embodiment. FIG. 13(a) is a block diagram of a portion applied with the light transmission module 10 in the portable telephone 40 incorporating the light transmission module 10 serving as the variant 2-4, and FIG. 13(b) is a block diagram showing a schematic configuration of the light transmission module 10.

In the light transmission module 10 of the variant 2-4, the CPU 29 and the light transmission processing unit 2 are connected with one transmission path, and the data signals and the control signals are input to the light transmission processing unit 2 via the relevant transmission path. To this end, the light transmission module 10 includes a signal separator 27 for separating the data signal and the control signal, where the data signal separated by the signal separator 27 is input to the I/F circuit 21 of the light transmission processing unit 2 while the control signal separated by the signal separator 27 is input to the power supply controller 25 of the light transmission processing unit 2 and the power supply controller 34 of the light reception processing unit 3 via the electrical transmission path 5.

Figure 13:
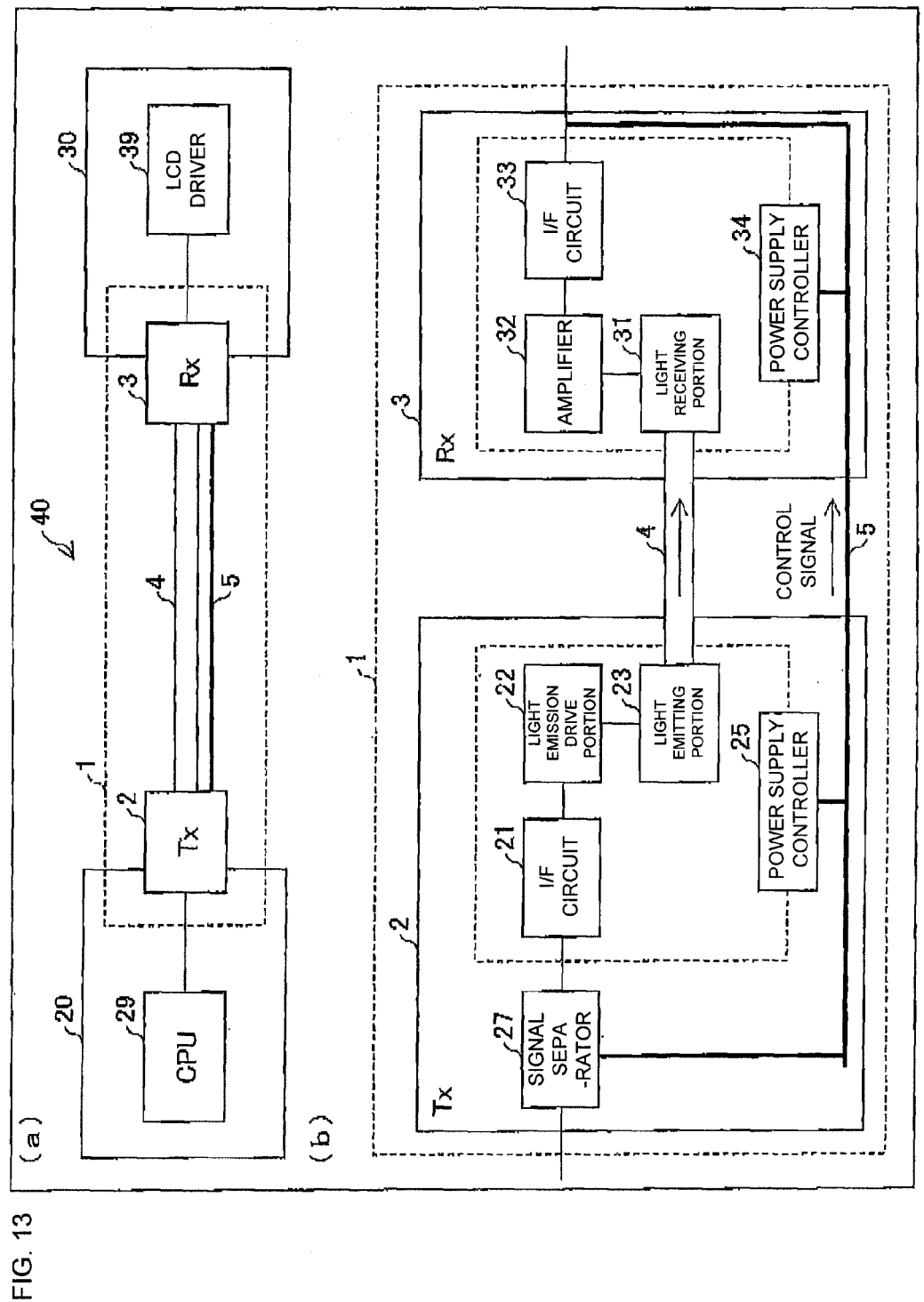
FIG. 13(a) is a block diagram of a portion applied with the light transmission module in the foldable portable telephone incorporating the light transmission module serving as a variant 2-4 and FIG. 13(b) is a block diagram showing a schematic configuration of the light transmission module.

The electrical transmission path 5 may be configured to be connected only to the power supply controller 34 of the light reception processing unit 3 so as to control the power supply of the light reception processing unit 3, or may be configured to be connected to the transmission path for transmitting the data signal output from the light reception processing unit 3, as shown in FIG. 13(*b*). According to such configuration, the control signal output from the CPU 29 can be input to the LCD driver 39 and the like of the application circuit board 30. The effects similar to the variant 2-2 are thereby obtained and the number of transmission paths to be connected to the light transmission module 10 can be reduced, whereby the light transmission module 10 can be applied to a smaller device.

The specific configuration of the signal separator 27 will be described with the following configuration examples 1 to 4.

Configuration Example 1 of Signal Separator

Figure 14:
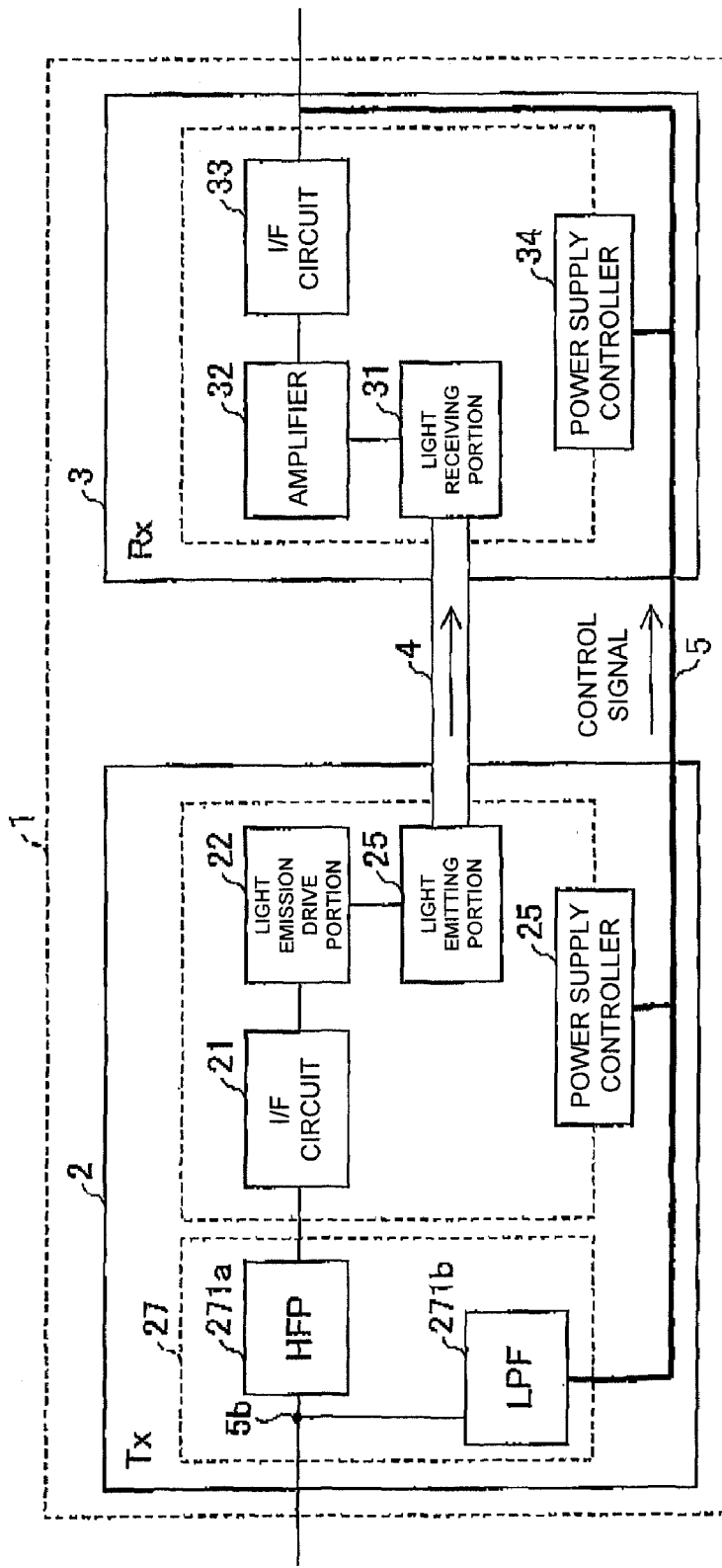
FIG. 14 is a block diagram showing a schematic configuration of the light transmission module serving as a configuration example 1.

A configuration example 1 of the signal separator 27 is a configuration of separating the data signal and the control signal based on the value of the frequency of the signal (hereinafter referred to as input signal) input to the light transmission module 10. FIG. 14 is a block diagram showing a schematic configuration of the light transmission module 10 serving as the configuration example 1. As shown in the figure, the signal separator 27 is configured by a high-pass filter (hereinafter referred to as HPF) 271*a* and a low-pass filter (hereinafter referred to as LPF) 271*b*. Specifically, the HPF 271*a* is arranged on the transmission path between the branched portion 5*b* of the transmission path for data signal transmission and the transmission path for control signal transmission, and the I/F circuit 21 of the light transmission processing unit 2, and the LPF 271*b* is arranged on the electrical transmission path 5 between the branched portion 5*b* and the power supply controller 25 of the light transmission processing unit 2.

The data signal of high frequency (high speed) can be transmitted to the I/F circuit 21 via the HPF 271*a* under normal circumstances, and the control signal of low frequency (low speed) can be transmitted to the power supply controller 25 and the light reception processing unit 3 via the LPF 271*b* under normal circumstances.

Figure 15:
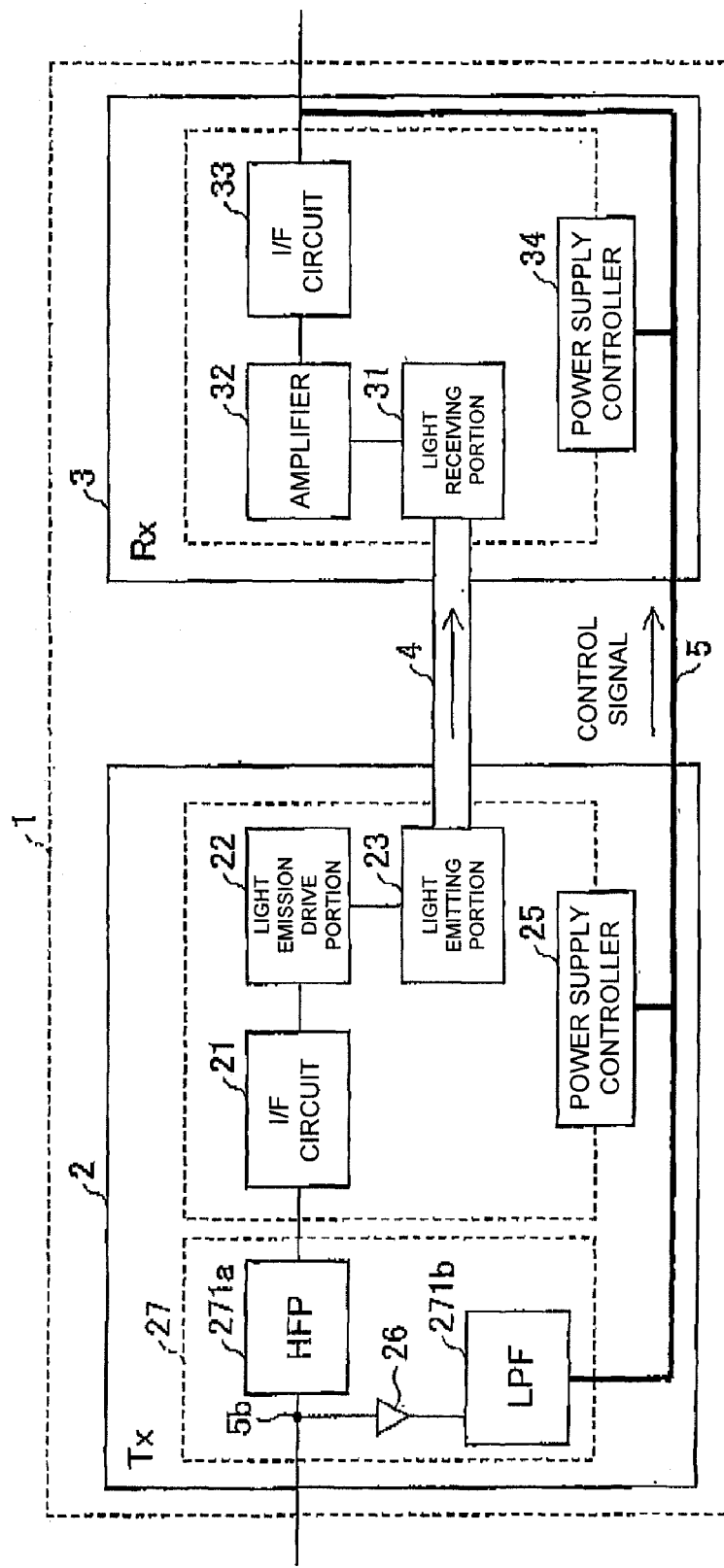
FIG. 15 is a block diagram showing a schematic configuration in a case where the high input impedance circuit is further arranged in the light transmission module serving as the configuration example 1.

If the data signal is a high frequency (RF) signal of a several hundred MHz band, it is susceptible to the impedance of the electrical transmission path 5 on the low speed side, and waveform bluntness occurs. As shown in FIG. 15, the light transmission module 10 of the configuration example 1 may further include the high input impedance circuit 26 between the branched portion 5*b* and the LPF 271*b* so that the electrical transmission path 5 seen from the data signal becomes high impedance, similar to the variant 2-3. The data signal of RF band thus can be accurately transmitted to the light transmission processing unit 2. A specific example of the high input impedance circuit 26 is an inverter circuit that uses a MOS transistor for the input unit.

Configuration Example 2 of Signal Separator

Figure 16:
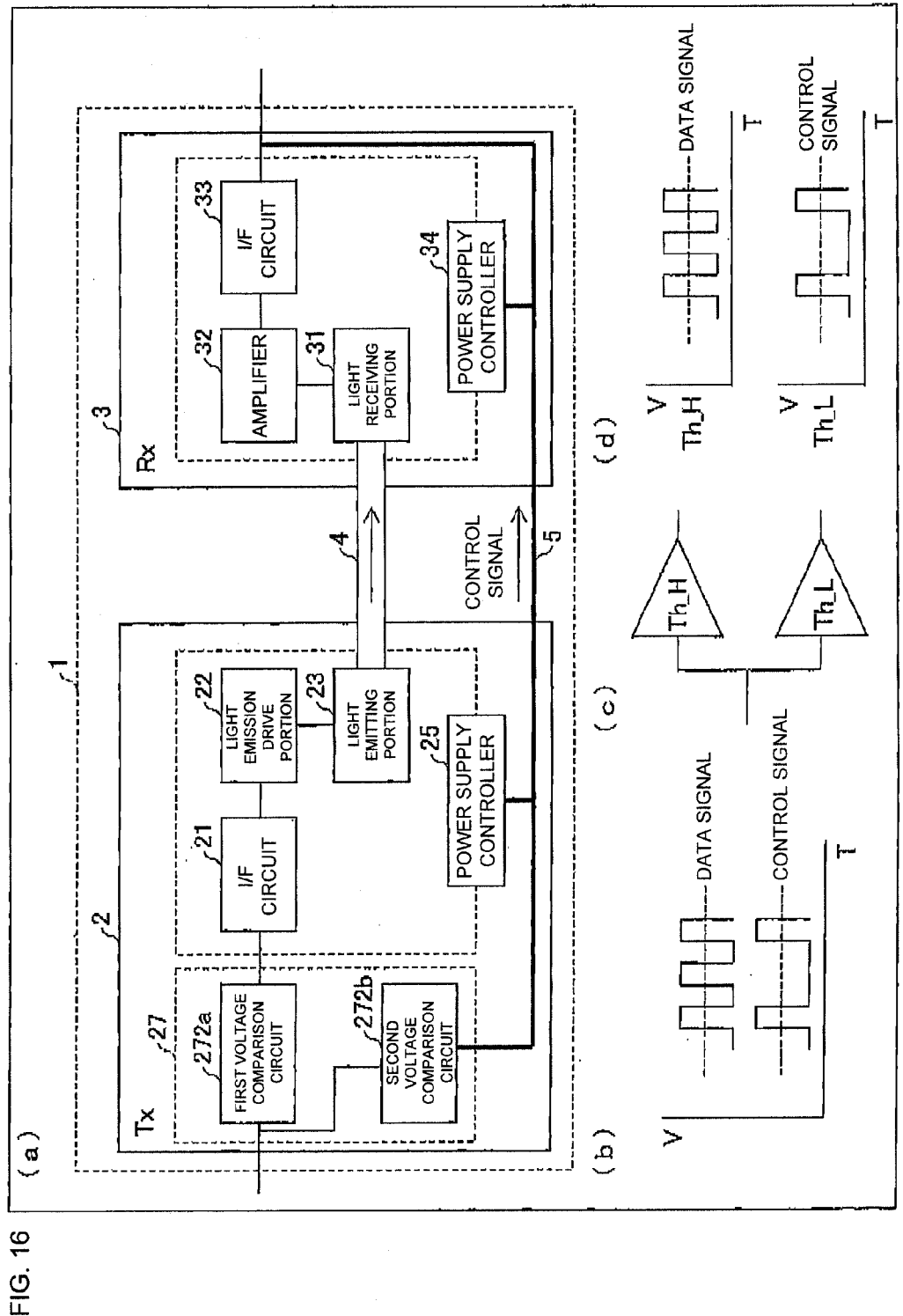
FIG. 16(a) is a block diagram showing a schematic configuration of the light transmission module serving as a configuration example 2.
FIG. 16(b) is a view showing a waveform of the signal input to the light transmission module.
FIG. 16(c) is a circuit diagram of a voltage comparison circuit arranged in the light transmission module.
FIG. 16(d) is a view showing a waveform of a signal separated by the voltage comparison circuit.

A configuration example 2 of the signal separator 27 is a configuration of separating the data signal and the control signal based on the voltage level of the input signal. This configuration is effective when the voltage level of the data signal and the voltage level of the control signal differ, as shown in FIG. 16(*a*). FIG. 16(*a*) is a block diagram showing a schematic configuration of the light transmission module 10 serving as the configuration example 2. As shown in FIG. 16(*a*), the signal separator 27 is configured by a first voltage comparison circuit (first voltage comparison means) 272*a* and a second voltage comparison circuit (second voltage comparison means) 272*b* each having different threshold values. FIG. 16(*c*) is a circuit diagram of each of the voltage comparison circuits 272*a*, 272*b*, and FIG. 16(*d*) is a view showing a waveform of the signal separated by the voltage comparison circuits 272*a*, 272*b*.

The threshold value is set high (Th_H; first voltage value) in the first voltage comparison circuit 272*a* so that the input signal of high voltage level is transmitted to the I/F circuit 21 on the downstream side, and the threshold value is set low (Th_L; second voltage value) in the second voltage comparison circuit 272*b* so that the input signal of low voltage level is transmitted to the power supply controller 25 and the light transmission processing unit 3 on the downstream side.

Therefore, as shown in FIG. 16(*b*), the input signal is assumed as the data signal and transmitted to the I/F circuit 21 when the threshold value (Th_H) is in the range of change of the voltage level of the input signal, whereas the input signal is assumed as the control signal and transmitted to the power supply controller 25 and the light reception processing unit 3 when the threshold value (Th_L) is in the range of change of the voltage level of the input signal.

Configuration Example 3 of Signal Separator

Figure 17:
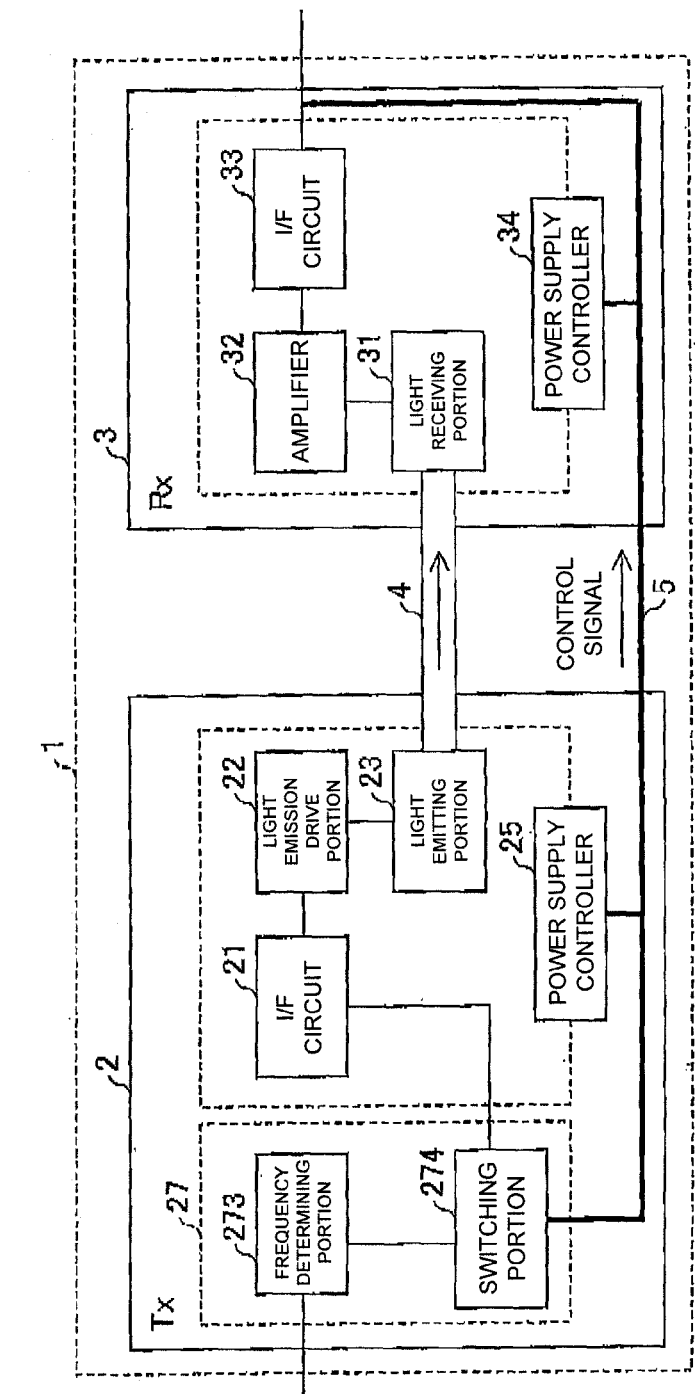
FIG. 17 is a block diagram showing a schematic configuration of the light transmission module serving as a configuration example 3.

A configuration example 3 of the signal separator 27 is a configuration of separating the data signal and the control signal based on the value of the frequency of the input signal, similar to the configuration example 1. FIG. 17 is a block diagram showing a schematic configuration of the light transmission module 10 serving as the configuration example 3. As shown in the figure, the signal separator 27 is configured by a frequency determining portion 273 and a switching portion 274.

The frequency determining portion 273 determines the frequency of the input signal. Specifically, the frequency determining portion 273 determines whether or not the value of the frequency of the input signal is greater than a value set in advance, and outputs the determination result to the switching portion 274. The switching portion 274 switches the transmission path for data signal transmission and the transmission path for control signal transmission by a switch based on the determination result received from the frequency determining portion 273.

Similar to the configuration example 1, the data signal of high frequency (high speed) can be transmitted to the I/F circuit 21 under normal circumstances, and the control signal of low frequency (low speed) can be transmitted to the power supply controller 25 and the light reception processing unit 3 under normal circumstances.

Configuration Example 4 of Signal Separator

Figure 18:
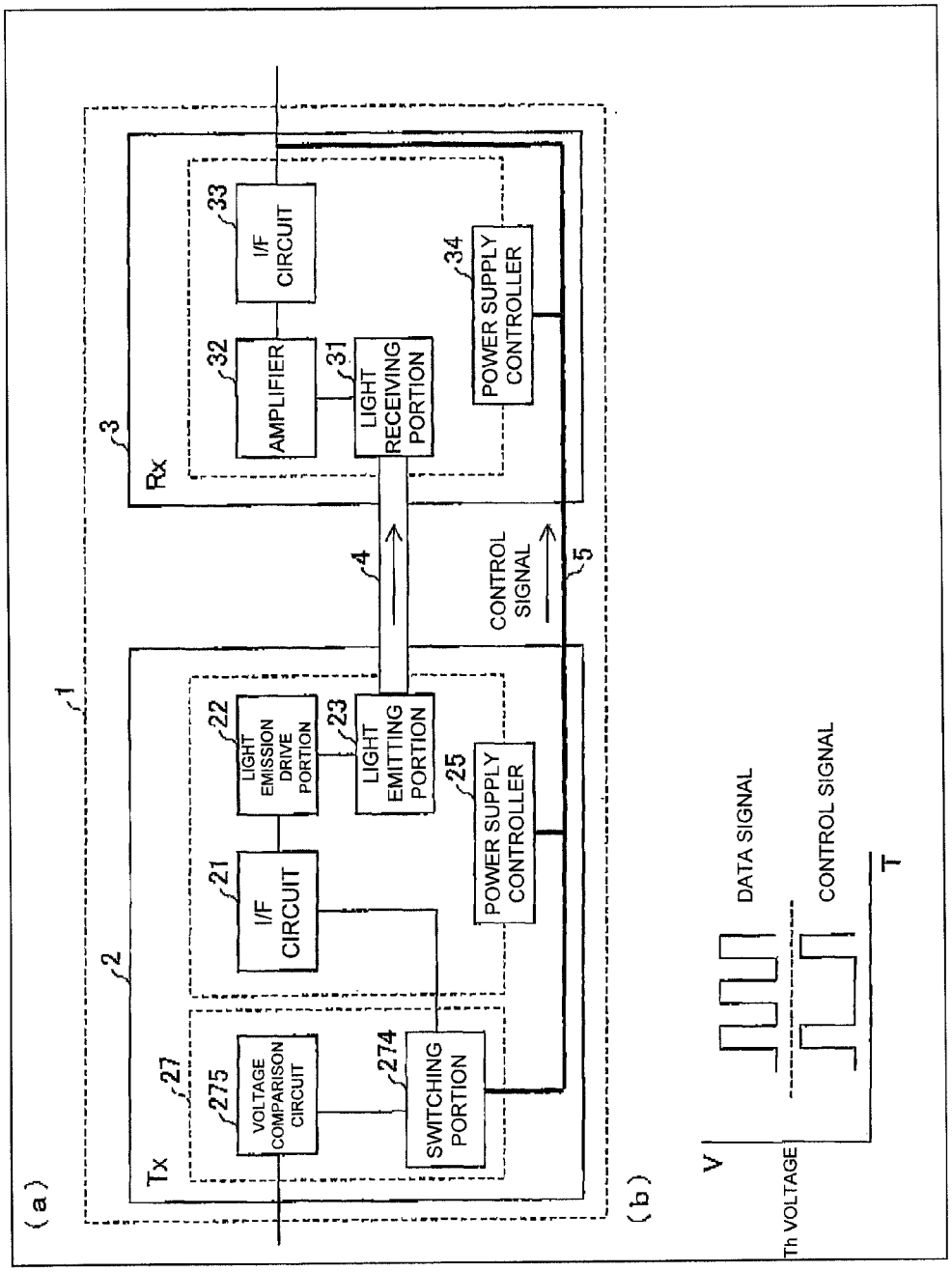
FIG. 18(a) is a block diagram showing a schematic configuration of the light transmission module serving as a configuration example 4.
FIG. 18(b) is a view showing a waveform of the signal input to the light transmission module.

Similar to the configuration example 2, a configuration example 4 of the signal separator 27 is a configuration of separating the data signal and the control signal based on the voltage level of the input signal. This configuration is effective when the voltage level of the data signal and the voltage level of the control signal differ, as shown in FIG. 18(*a*), similar to the configuration example 2. FIG. 18(*a*) is a block diagram showing a schematic configuration of the light transmission module 10 serving as the configuration example 4. As shown in FIG. 18(*a*), the signal separator 27 is configured by a voltage comparison circuit (voltage comparison means) 275 and the switching portion 274.

The voltage comparison circuit 275 determines the voltage level of the input signal. Specifically, the voltage comparison circuit 275 determines whether or not the voltage level of the input signal is greater than the threshold value (Th voltage) set in advance shown in FIG. 18(*b*), and outputs the determination result to the switching portion 274. The switching portion 274 switches the transmission path for data signal transmission and the transmission path for control signal transmission based on the determination result received from the voltage comparison circuit 275.

Therefore, similar to the configuration example 2, the input signal (data signal) can be transmitted to the I/F circuit 21 if the input signal is greater than the threshold value, and the input signal (control signal) can be transmitted to the power supply controller 25 and the light reception processing unit 3 if the input signal is smaller than the threshold value.

As described in the first and the second embodiments, the light transmission module of the present invention has a configuration in which the power supply controller 25 of the light transmission processing unit 2 and the power supply controller 34 of the light reception processing unit 3 control the power supply of each portion configuring the light transmission processing unit 2 and the light reception processing unit 3 based on the received control signal. In other words, in the light transmission module according to one or more embodiments of the present invention, the control signal is output from the light transmission processing unit 2 (or light reception processing unit 3) and is input to the power supply controller 34 (or the power supply controller 25) of the light reception processing unit 3 (or light transmission processing unit 2), as shown in FIG. 1(a) and FIG. 1(b) (FIG. 10(a) and FIG. 10(b)).

Figure 2:
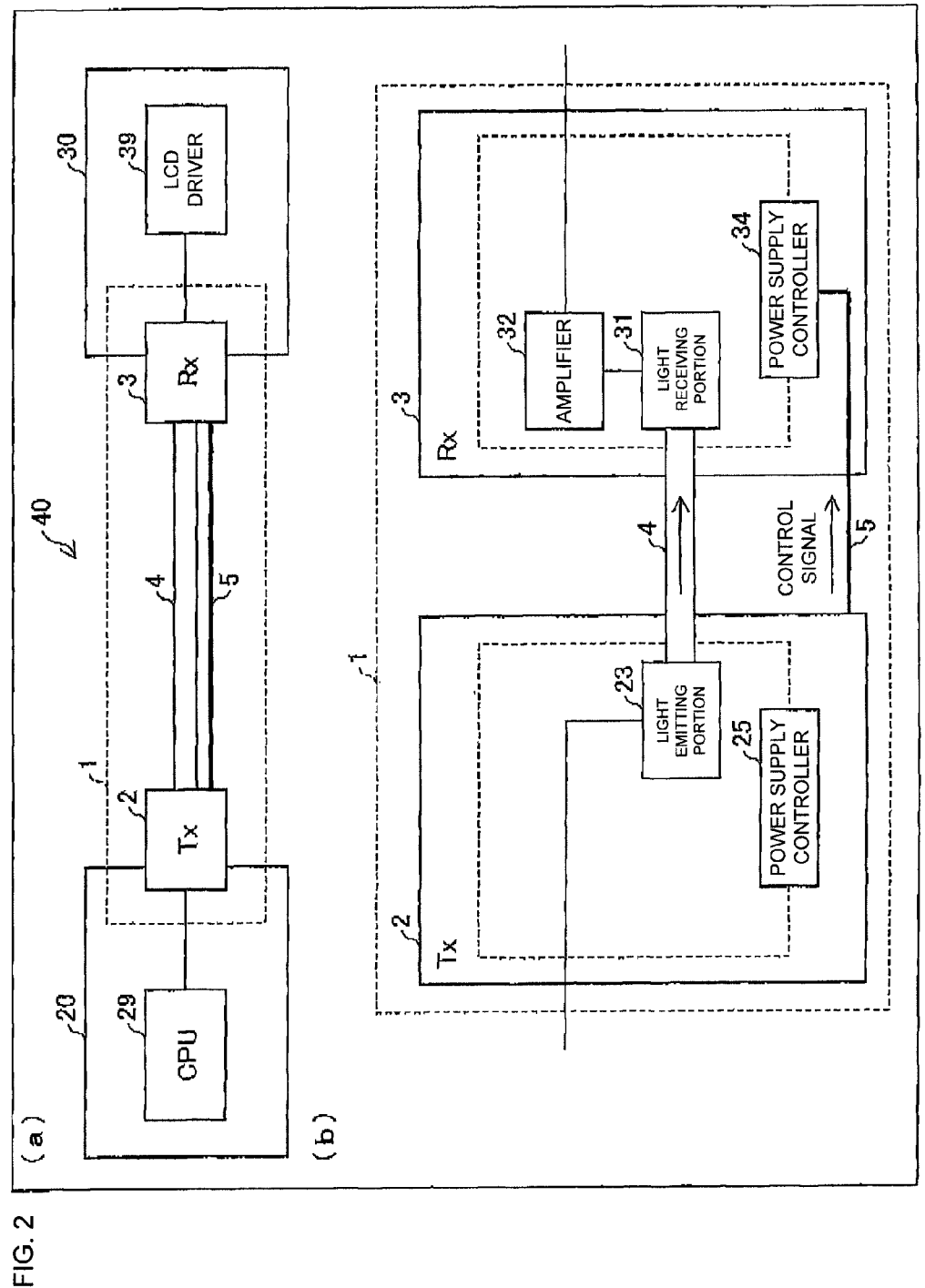
FIG. 2(a) is a block diagram showing a portion applied with a light transmission module in a foldable portable telephone of another configuration incorporating the light transmission module of the present embodiment.
FIG. 2(b) is a block diagram schematically showing the light transmission module.
Figure 3:
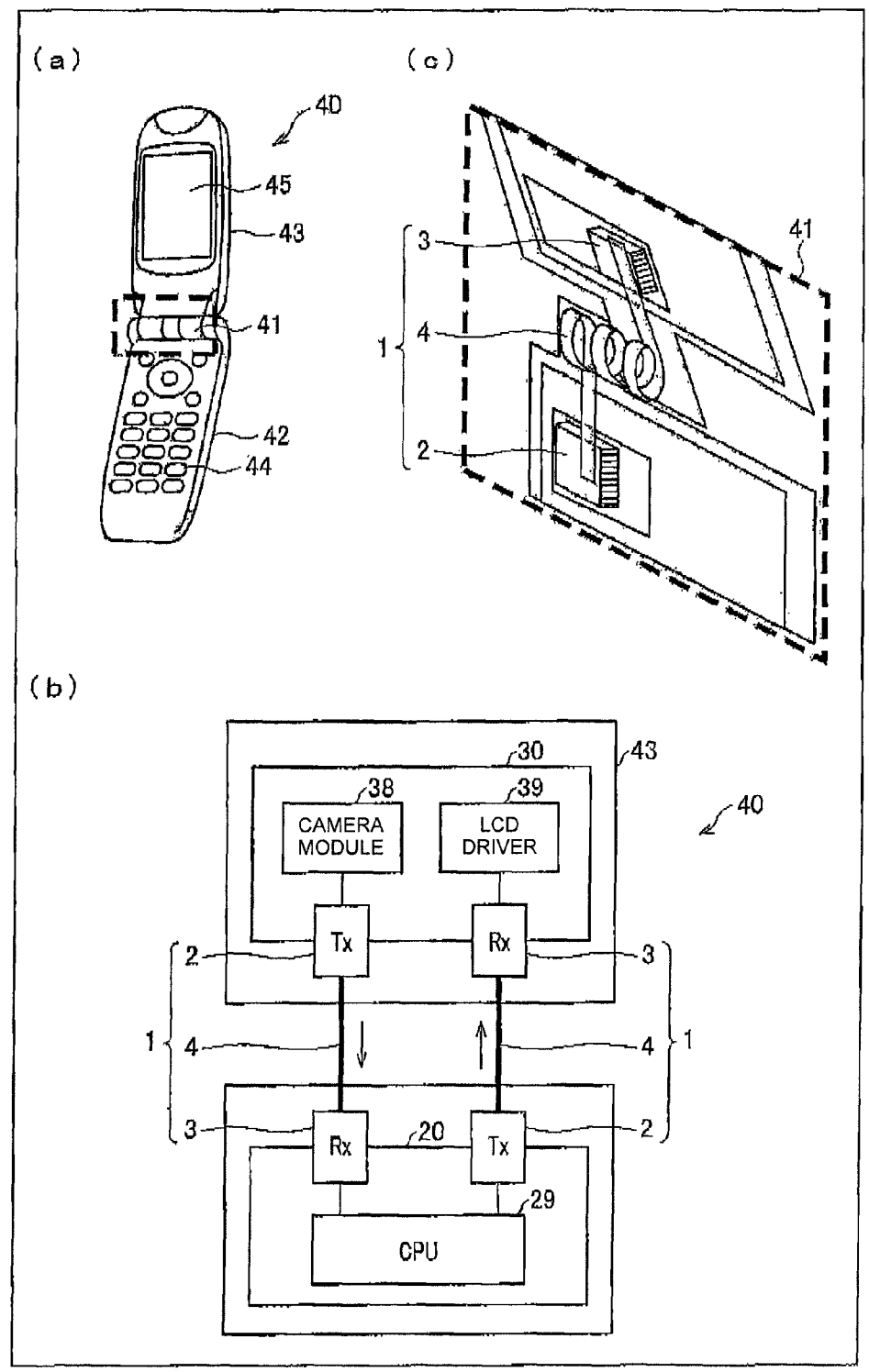
FIG. 3(a) is a perspective view showing an outer appearance of a foldable portable telephone incorporating a light transmission module of the first embodiment.
FIG. 3(b) is a block diagram of a portion applied with the light transmission module in the foldable portable telephone shown in FIG. 3(a)
FIG. 3(c) is a perspective plan view of a hinge (portion surrounded with a broken line) in FIG. 3(a).
Figure 4:
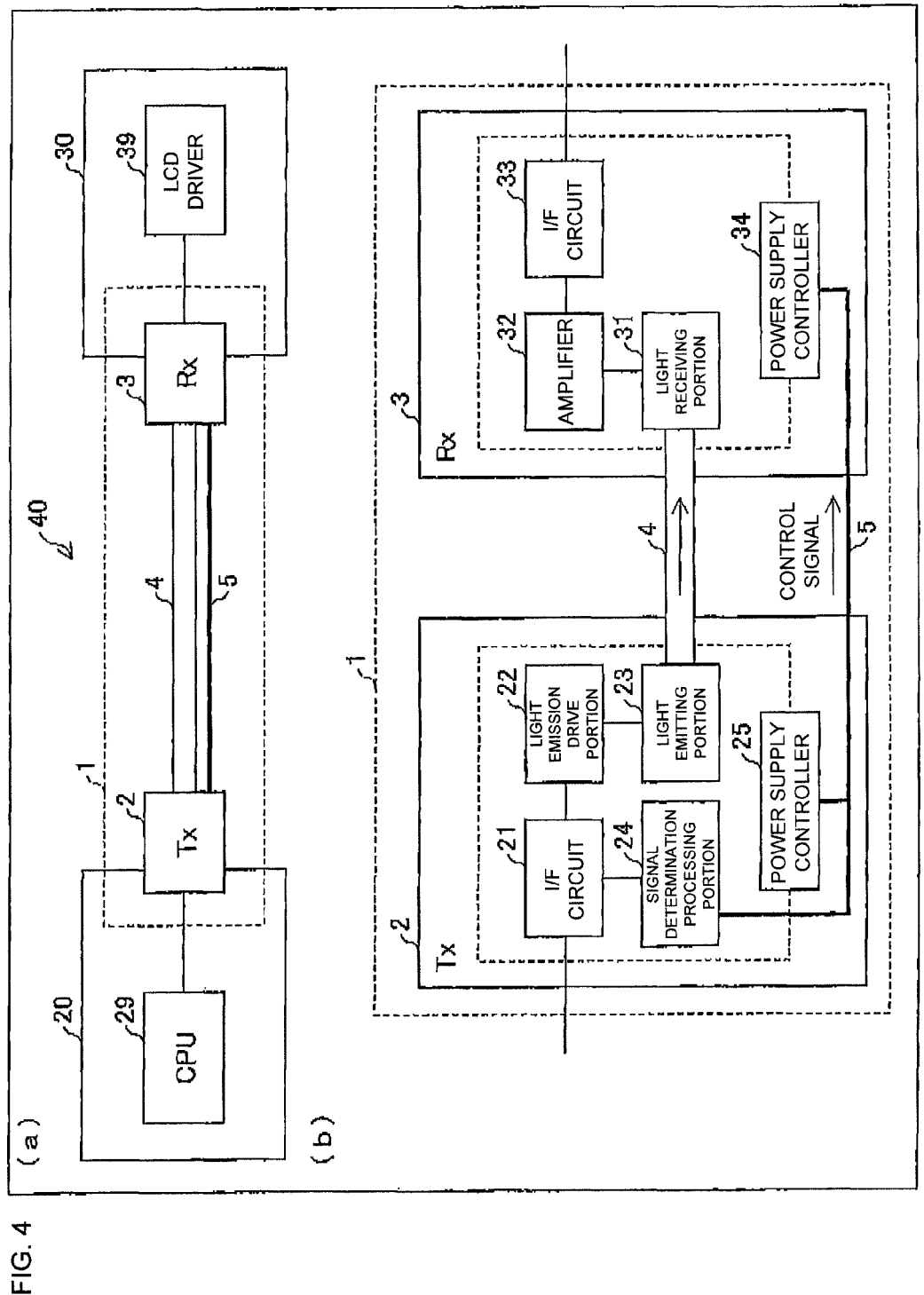
FIG. 4(a) is a block diagram of a portion applied with the light transmission module in the foldable portable telephone incorporating the light transmission module of the first embodiment.
FIG. 4(b) is a block diagram showing a schematic configuration of the light transmission module.
Figure 5:
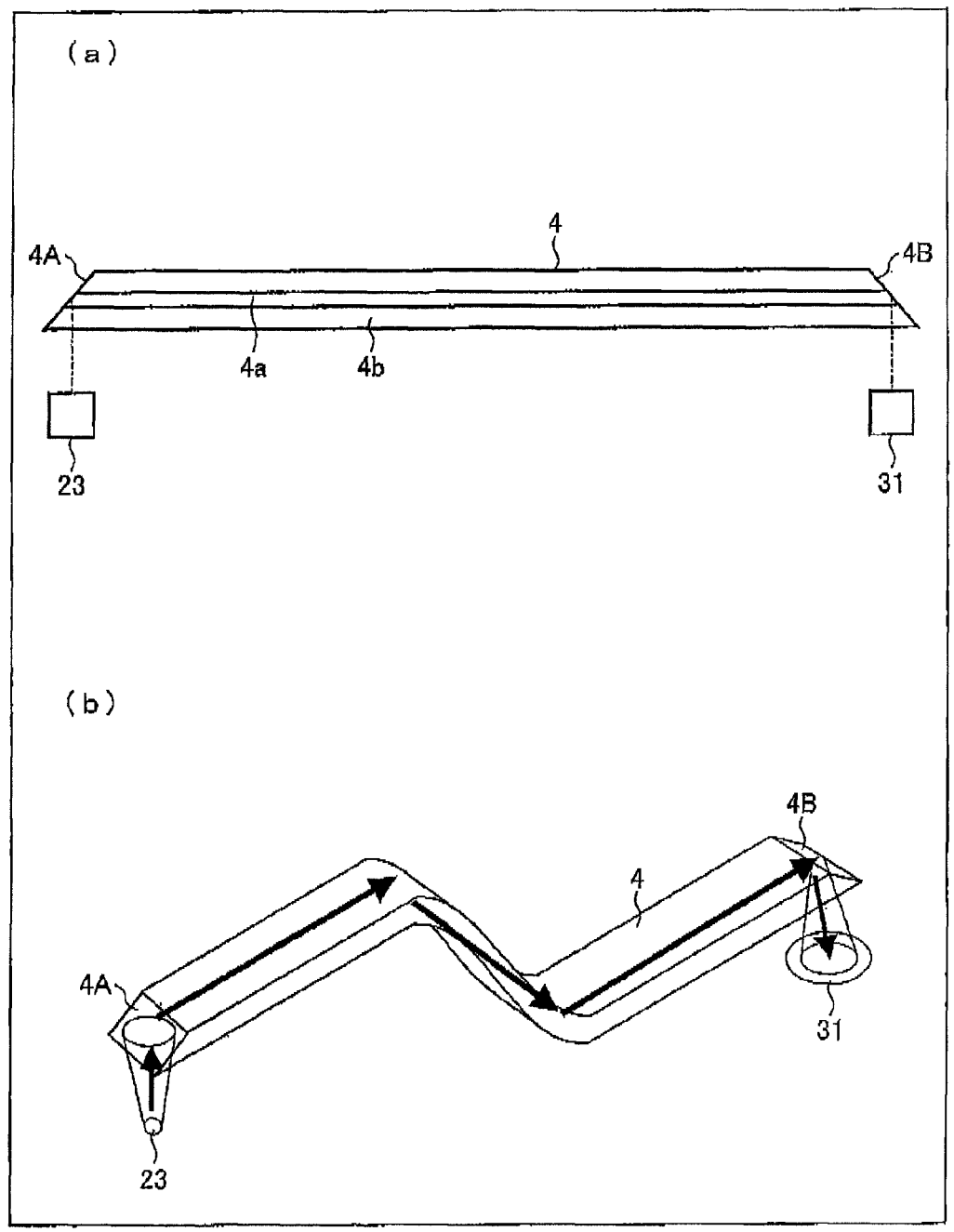
FIG. 5(a) is a side view of the light transmission path.
FIG. 5(b) is a view schematically showing a state of light transmission in the light transmission path.

As shown in FIG. 2(a) and FIG. 2(b), the light transmission module according to one or more embodiments of the present invention merely needs to have a configuration in which the light transmission processing unit 2 includes the light emitting portion 23 and the power supply controller 25 for controlling the power supply of the light emitting portion 23, and the light reception processing unit 3 includes the light receiving portion 31, the amplifier 32 and the power supply controller 34 for controlling the power supply thereof, where the I/F circuit 21, the light emission drive portion 22, and the I/F circuit 33 may be arranged exterior to the light transmission module.

Application Example

The light transmission module of the present embodiment can be applied to the following application examples. In the first and the second embodiments, an example of being applied to the portable telephone 40 has been described as a first application example, but the light transmission module of the present invention is not limited thereto, and may be applied to a hinge and the like of a foldable electronic device such as a foldable PHS (Personal Handyphone System), a foldable PDA (Personal Digital Assistant), a foldable notebook computer and the like.

A high speed and large capacity communication can be realized in a limited space by applying the light transmission module to such foldable electronic devices. Therefore, it is particularly suitable in devices where high speed and large capacity data communication is necessary and miniaturization is demanded such as the foldable liquid crystal display.

As a second application example, the light transmission modules 1, 10 according to one or more embodiments of the present invention can be applied to a device including a drive portion such as such as a printer head in a printing device (electronic device) and a reading unit in a hard disc recording and reproducing device.

Figure 19:
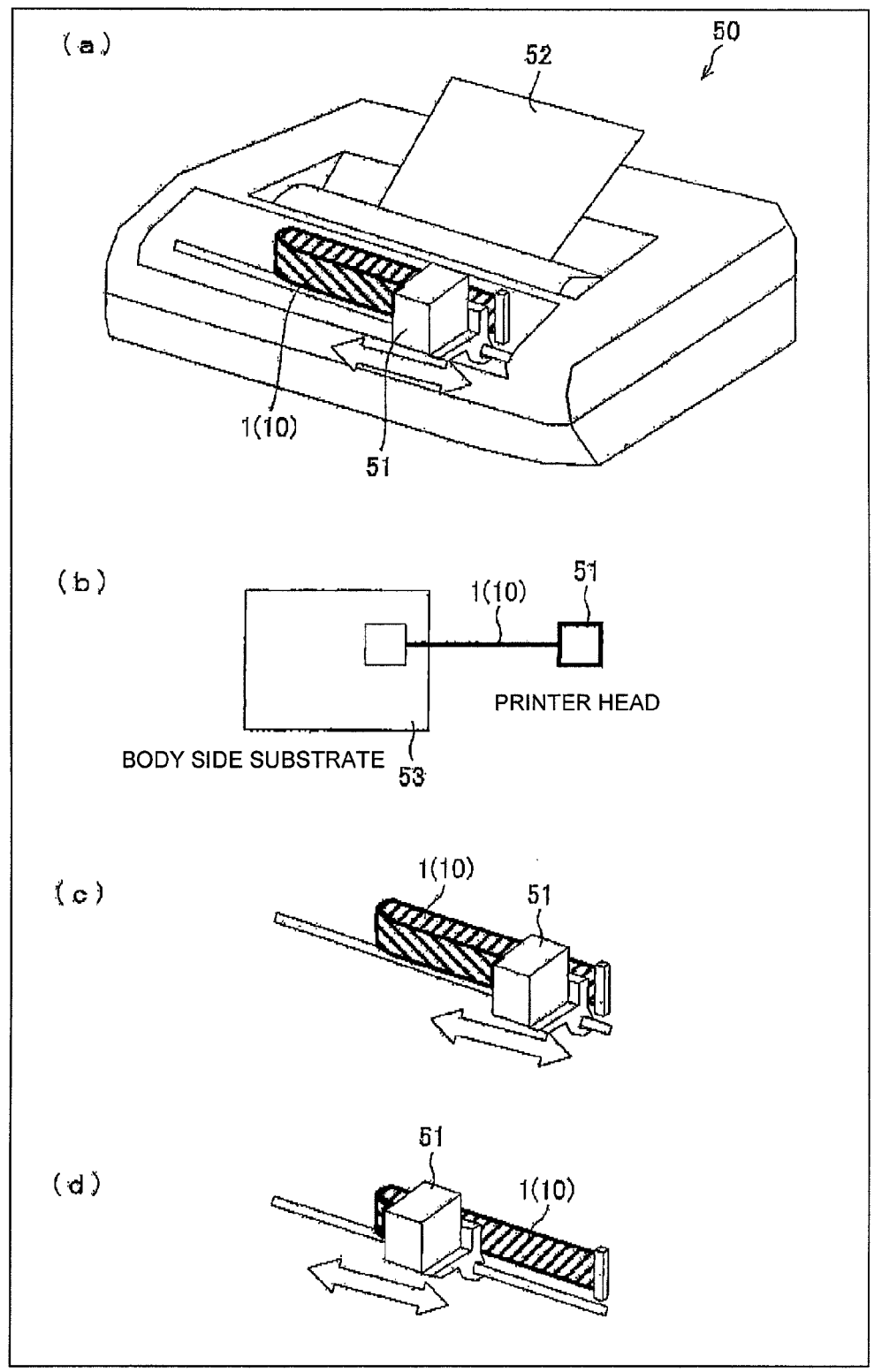
FIG. 19(a) is a perspective view showing an outer appearance of a printing device including the light transmission module according to the present embodiment.
FIG. 19(b) is a block diagram showing the main parts of the printing device shown in FIG. 19(a), and FIGS. 19(c) and 19(d) are perspective views showing a curved state of the light transmission path when the printer head is moved (driven) in the printing device.

FIGS. 19A to 19C show an example in which the light transmission modules 1, 10 are applied to a printing device 50. FIG. 19(a) is a perspective view showing an outer appearance of the printing device 50. As shown in the figure, the printing device 50 includes a printer head 51 for performing printing on a paper 52 while moving in a width direction of a paper 52, where one end of the light transmission modules 1, 10 is connected to the printer head 51.

FIG. 19(b) is a block diagram of a portion where the light transmission modules 1, 10 are applied in the printing device 50. As shown in the figure, one end of the light transmission modules 1, 10 is connected to the printer head 51, and the other end is connected to a body side substrate in the printing device 50. The body side substrate includes a control means etc. for controlling the operation of each unit of the printing device 50, and the like.

FIG. 19(c) and FIG. 19(d) are perspective views showing a curved state of the light transmission path 4 when the printer head 51 is moved (driven) in the printing device 50. As shown in the figure, when the light transmission path 4 is applied to the drive portion such as the printer head 51, the curved state of the light transmission path 4 changes by the drive of the printer head 51 and each position of the light transmission path 4 is repeatedly curved.

Therefore, the light transmission modules 1, 10 according to the present embodiment are suited for such drive portion. High speed and large capacity communication using the drive portion can be realized by applying the light transmission modules 1, 10 to such drive portions.

Figure 20:
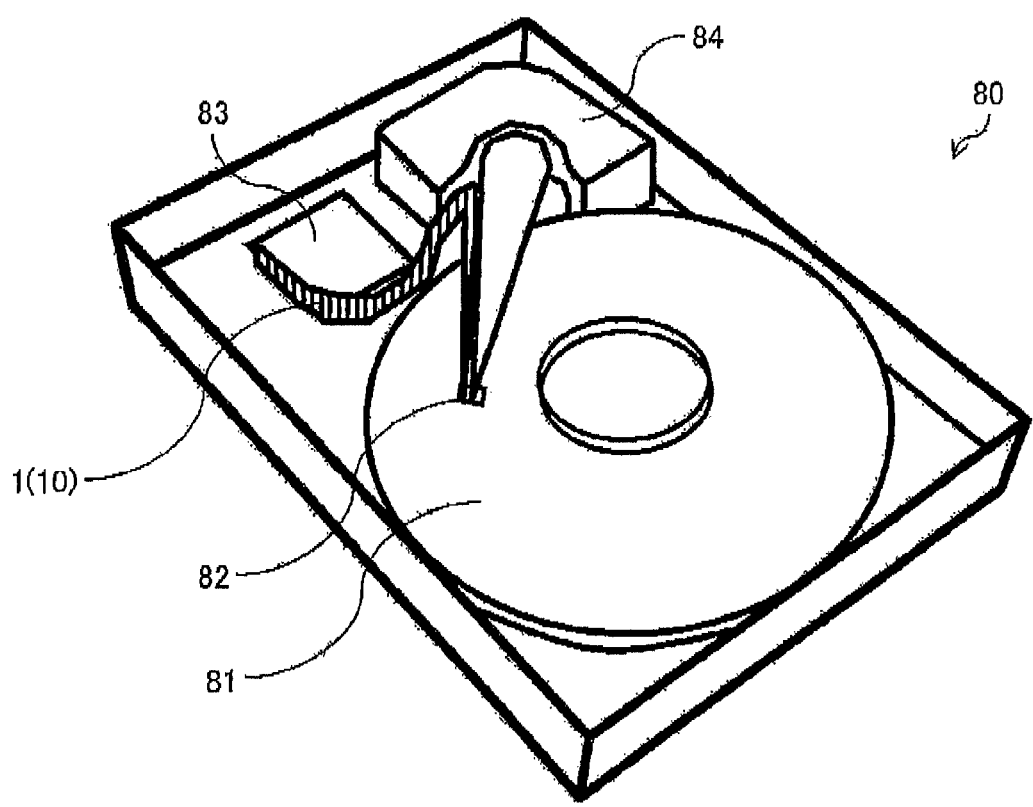
FIG. 20 is a perspective view showing an outer appearance of a hard disc recording and reproducing device including the light transmission module according to the present embodiment.
Figure 21:
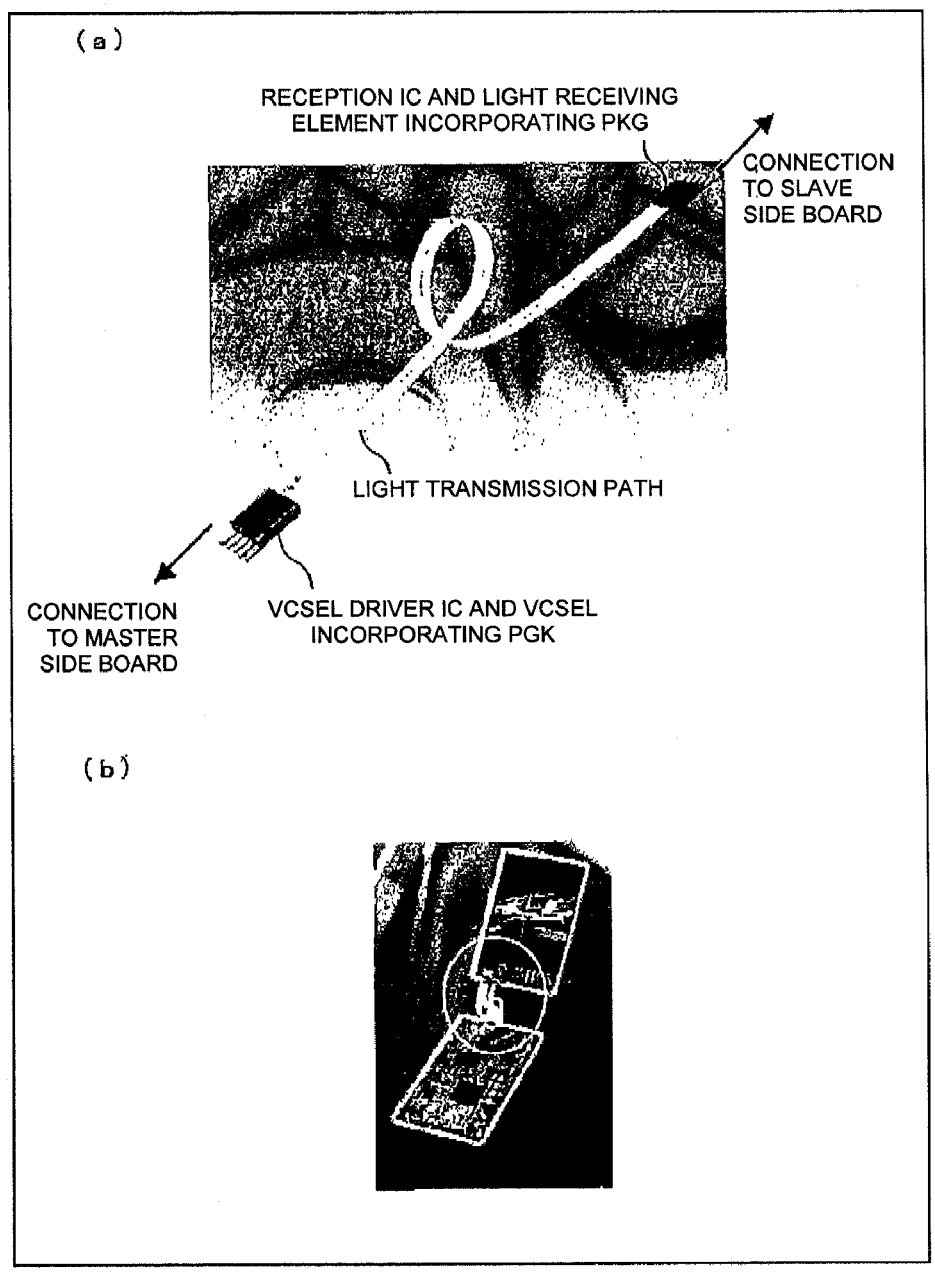
FIG. 21(a) is a perspective view showing an outer appearance of a typical light transmission module.
FIG. 21(b) is a perspective view showing an inner appearance of a foldable portable telephone incorporating the light transmission module.
Figure 22:
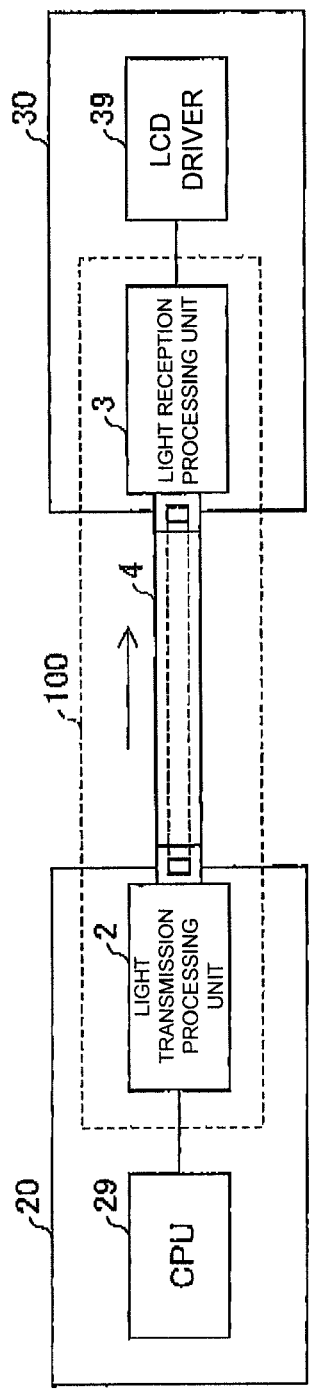
FIG. 22 is a block diagram of a portion applied with the light transmission module in the foldable portable telephone incorporating the light transmission module shown in FIG. 21(a).
Figure 23:
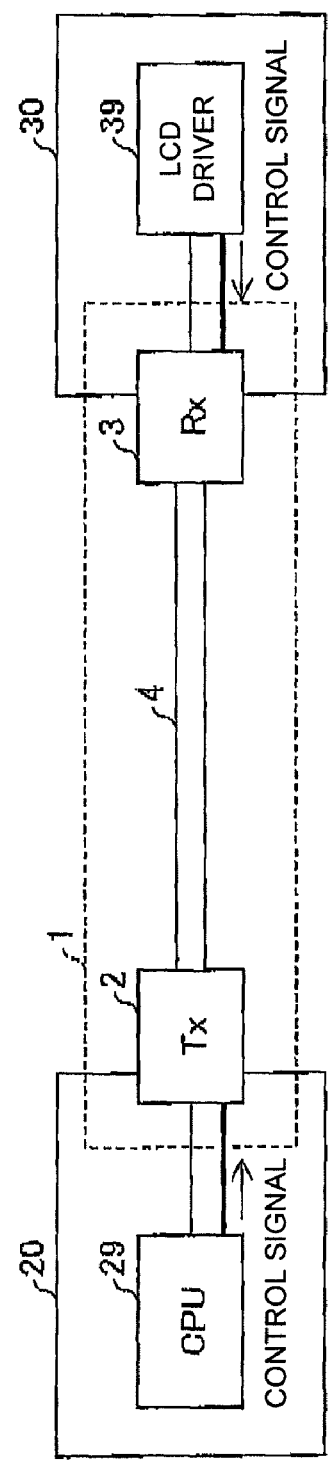
FIG. 23 is a block diagram of a portion applied with the light transmission module in the foldable portable telephone incorporating the light transmission module of the prior art.
Figure 24:
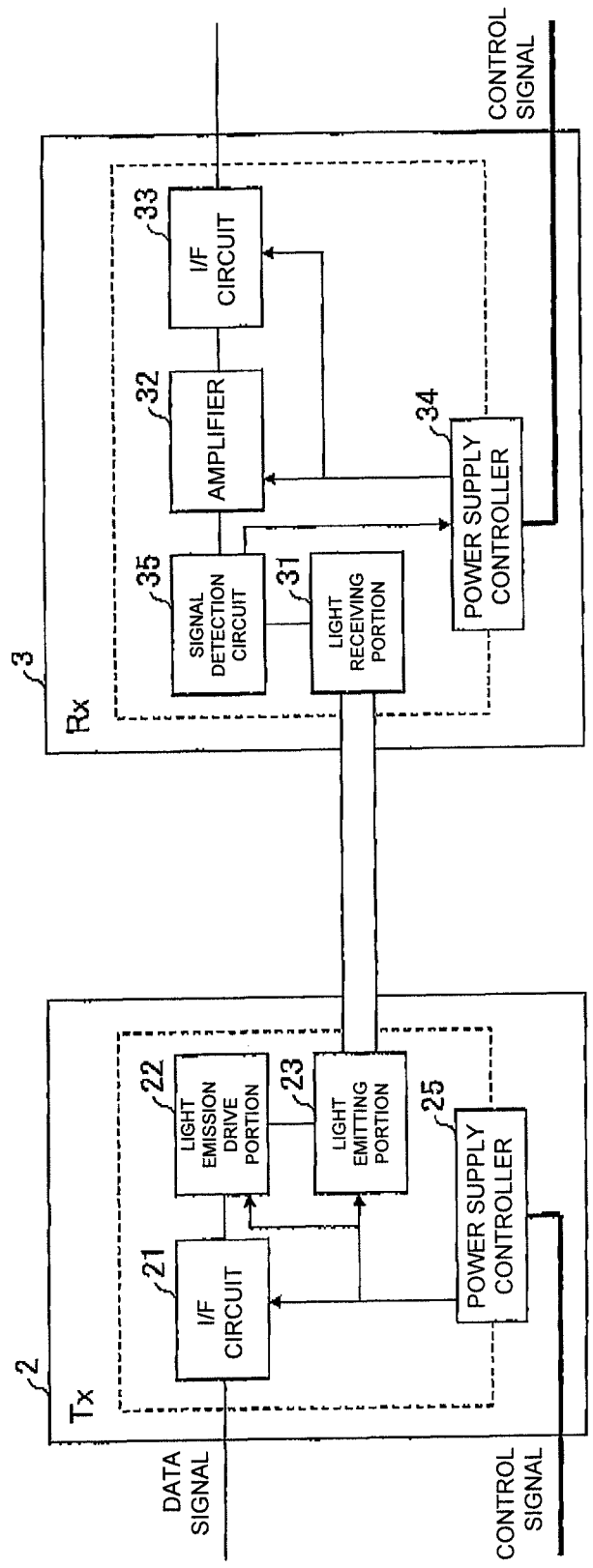
FIG. 24 is a block diagram showing a schematic configuration of the light transmission module of the prior art.

FIG. 20 shows an example in which the light transmission path 4 is applied to a hard disc recording and reproducing device 60.

As shown in the figure, the hard disc recording and reproducing device 60 includes a disc (hard disc) 61, a head (read/write head) 62, a substrate introducing portion 63, a drive portion (drive motor) 64, and the light transmission modules 1, 10.

The drive portion 64 drives the head 62 along a radial direction of the disc 61. The head 62 reads the information recorded on the disc 61 and writes information to the disc 61. The head 62 is connected to the substrate introducing portion 63 by way of the light transmission modules 1, 10, and propagates the information read from the disc 61 to the substrate introducing portion 63 as an optical signal and receives the optical signal of the information to write to the disc 61 propagated from the substrate introducing portion 63.

Therefore, high speed and large capacity communication can be realized by applying the light transmission modules 1, 10 to the drive portion such as the head 62 in the hard disc recording and reproducing device 60.

The present invention is not limited to the above-described embodiments, and various modifications may be made within the scope of the Claims. In other words, the embodiments obtained by combining the technical means appropriately modified within the scope of the Claims are encompassed in the technical scope of the present invention.

As described above, the light transmission module in one or more embodiments of the present invention has a configuration of connecting the light transmitting unit and the light receiving unit, and including at least one electrical transmission path for transmitting the control signal for controlling the power supply to the light emitting portion and the light receiving portion to the first power supply controller and the second power supply controller, in which the first power supply controller and the second power supply controller control the power supply to the light emitting portion and the light receiving portion based on the control signal input via the electrical transmission path.

The start/stop of the light emitting portion and the light receiving portion thus can be controlled by the same control signal. Therefore, a light transmission module capable of reducing the power consumption in time of standby with a simple configuration is thereby obtained.

Specific embodiments or examples described in the BEST MODE FOR CARRYING OUT THE INVENTION merely clarify the technical content of the present invention and should not be construed in a narrow sense limiting to only such specific examples, and can be modified and implemented within the spirit of the invention and the scope of the Claims.

INDUSTRIAL APPLICABILITY

The light transmission module according to one or more embodiments of the present invention is applicable to the light communication path between various types of devices, and is also applicable to a flexible optical wiring serving as an in-device wiring mounted in a small and thin commercial-off-the-shelf device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A light transmission module comprising:
  a light transmitting unit comprising:
    a light emitting portion for outputting an optical signal corresponding to a data signal input as an electrical signal, and
    a first power supply controller for controlling a drive power supply of the light emitting portion;
  a light transmission path for transmitting the optical signal introduced from the light transmitting unit; and
  a light receiving unit comprising:
    a light receiving portion for receiving the optical signal output from the light transmission path and outputting an electrical signal corresponding to the optical signal, and
    a second power supply controller for controlling a drive power supply of the light receiving portion; and
  at least one electrical transmission path, connecting the light transmitting unit and the light receiving unit, for transmitting a control signal for controlling power supply to the light transmitting unit and the light receiving unit to the first power supply controller and the second power supply controller;
  wherein the first power supply controller and the second power supply controller control the power supply to the light transmitting unit and the light receiving unit based on the control signal input via the electrical transmission path;
  wherein the light transmitting unit receives an input signal of the data signal and the control signal from respective transmission source via the same transmission path;
  wherein the light transmitting unit further comprises a signal separating means for separating the received input signal to one of the data signal and the control signal; and
  wherein the signal separating means inputs the data signal to the light emitting portion while inputting the control signal to the first power supply controller and the second power supply controller via the electrical transmission path;
  wherein the signal separating means comprises a high-pass filter and a low-pass filter;
  wherein the high-pass filter is arranged on the transmission path connected to the light emitting portion, the input signal passed through the high-pass filter being input to the light emitting portion;
  wherein the low-pass filter is arranged on the electrical transmission path connected to the first power supply controller and the second power supply controller, the input signal passed through the low-pass filter being input to the first power supply controller and the second power supply controller via the electrical transmission path;
  wherein the high input impedance circuit is arranged between the branched portion and the low-pass filter, the branched portion being arranged between the electrical transmission path connected to the low-pass filter, on which the control signal is transmitted and the transmission path and the electrical transmission path connected to the light emitting portion, on which the data signal is transmitted, so that the electrical transmission path on which the control signal is transmitted becomes high impedance when seen from the transmission path on which the data signal is transmitted.

2. The light transmission module according to claim 1, wherein the second power supply controller controls the power supply to the light receiving unit based on the control signal input via the electrical transmission path from the light transmitting unit.

3. The light transmission module according to claim 2, wherein
  the light transmitting unit further comprises a signal determination processing means for determining whether the data signal is input to the light transmitting unit and outputting the control signal to the first power supply controller and the second power supply controller based on the determination result; and
  the signal determination processing means inputs a control signal for stopping the power supply to the light emitting portion and the light receiving portion to the first power supply controller and the second power supply controller via the electrical transmission path when determined that the data signal is not input to the light transmitting unit, and inputs a control signal for starting the power supply to the light emitting portion and the light receiving portion to the first power supply controller and the second power supply controller via the electrical transmission path when determined that the data signal is input to the light transmitting unit.

4. The light transmission module according to claim 2, wherein
  the light transmitting unit receives the control signal from a transmission source side of the data signal and inputs the control signal to the first power supply controller and outputs the control signal to the electrical transmission path; and
  the light receiving unit receives the control signal transmitted via the electrical transmission path, and inputs the control signal to the second power supply controller.

5. The light transmission module according to claim 1, wherein the first power supply controller controls the power supply to the light transmitting unit based on the control signal input via the electrical transmission path from the light receiving unit.

6. The light transmission module according to claim 1, wherein
  the light transmitting unit further comprises a signal determination processing means for determining whether the data signal is input to the light transmitting unit and outputting the control signal to the first power supply controller and the second power supply controller based on the determination result; and the signal determination processing means inputs a control signal for stopping the power supply to the light transmitting unit and the light receiving unit to the first power supply controller and the second power supply controller via the electrical transmission path when determined that the data signal is not input to the light transmitting unit, and inputs a control signal for starting the power supply to the light transmitting unit and the light receiving unit to the first power supply controller and the second power supply controller via the electrical transmission path when determined that the data signal is input to the light transmitting unit.

7. The light transmission module according to claim 1, wherein the light transmitting unit receives the control signal from a transmission source side of the data signal and inputs the control signal to the first power supply controller and outputs the control signal to the electrical transmission path; and the light receiving unit receives the control signal transmitted via the electrical transmission path, and inputs the control signal to the second power supply controller.

8. The light transmission module according to claim 7, wherein the light receiving unit receives the control signal transmitted via the electrical transmission path, and inputs the control signal to the second power supply controller and outputs the control signal to the outside.

9. The light transmission module according to claim 7, wherein a high input impedance circuit is arranged between a branched portion of the electrical transmission path connected to the light receiving unit and the electrical transmission path connected to the first power supply controller, and the first power supply controller on the electrical transmission path so that the first power supply controller becomes high impedance when seen from the electrical transmission path.

10. The light transmission module according to claim 1, wherein the signal separating means comprises a first voltage comparison means for comparing a voltage level of the input signal and a first voltage value set in advance, and a second voltage comparison means for comparing the voltage level of the input signal and a second voltage value set in advance;

the first comparison means is arranged on the transmission path connected to the light emitting portion, the input signal being input to the light emitting portion if the first voltage value is in a range of change of the voltage level of the input signal; and the second comparison means is arranged on the electrical transmission path connected to the first power supply controller and the second power supply controller, the input signal being input to the first power supply controller and the second power supply controller via the electrical transmission path if the second voltage value is in a range of change of the voltage level of the input signal.

11. The light transmission module according to claim 1, wherein the signal separating means comprises a frequency determining means for detecting a frequency of the input signal and comparing the detected frequency and a frequency set in advance, and a switching means for switching a transmission direction of the input signal by a switch based on the result determined by the frequency determining means; and the switching means switches the switch to transmit the input signal to the transmission path connected to the light emitting portion when the frequency determining means determines that the frequency of the input signal is greater than the frequency set in advance while switching the switch to transmit the input signal to the electrical transmission path connected to the first power supply controller and the second power supply controller when the frequency determining means determines that the frequency of the input signal is smaller than the frequency set in advance.

12. The light transmission module according to claim 1, wherein the signal separating means comprises a voltage comparison means for detecting a voltage level of the input signal and comparing the detected voltage level and a voltage level set in advance, and a switching means for switching a transmission direction of the input signal by a switch based on the result compared by the voltage comparison means; and the switching means switches the switch to transmit the input signal to the transmission path connected to the light emitting portion when the voltage comparison means determines that the voltage level of the input signal is greater than the voltage level set in advance while switching the switch to transmit the input signal to the electrical transmission path connected to the first power supply controller and the second power supply controller when the voltage comparison means determines that the voltage level of the input signal is smaller than the voltage level set in advance.

13. The light transmission module according to claim 1, wherein the electrical transmission path comprises a flexible printed circuit board.

14. The light transmission module according to claim 1, wherein the electrical transmission path comprises a coaxial cable.

15. An electronic device comprising the light transmission module according to claim 1.

16. A light transmission module comprising:

a light transmitting unit comprising:

a light emitting portion for outputting an optical signal corresponding to a data signal input as an electrical signal, and a first power supply controller for controlling a drive power supply of the light emitting portion;

a light transmission path for transmitting the optical signal introduced from the light transmitting unit;

a light receiving unit comprising:

a light receiving portion for receiving the optical signal output from the light transmission path and outputting an electrical signal corresponding to the optical signal, and a second power supply controller for controlling a drive power supply of the light receiving portion; and at least one electrical transmission path, connecting the light transmitting unit and the light receiving unit, for transmitting a control signal for controlling power supply to the light transmitting unit and the light receiving unit to the first power supply controller and the second power supply controller;

wherein the first power supply controller and the second power supply controller control the power supply to the light transmitting unit and the light receiving unit based on the control signal input via the electrical transmission path;

wherein the light transmitting unit receives the control signal from a transmission source side of the data signal and inputs the control signal to the first power supply controller and outputs the control signal to the electrical transmission path; and the light receiving unit receives the control signal transmitted via the electrical transmission path, and inputs the control signal to the second power supply controller wherein the light transmitting unit receives an input signal of the data signal and the control signal from respective transmission source via the same transmission path;

wherein the light transmitting unit further comprises a signal separating means for separating the received input signal to one of the data signal and the control signal;

wherein the signal separating means inputs the data signal to the light emitting portion while inputting the control signal to the first power supply controller and the second power supply controller via the electrical transmission path;

wherein the signal separating means comprises a high-pass filter and a low-pass filter;

wherein the high-pass filter is arranged on the transmission path connected to the light emitting portion, the input signal passed through the high-pass filter being input to the light emitting portion;

wherein the low-pass filter is arranged on the electrical transmission path connected to the first power supply controller and the second power supply controller, the input signal passed through the low-pass filter being input to the first power supply controller and the second power supply controller via the electrical transmission path; and wherein the high input impedance circuit is arranged between the branched portion and the low-pass filter, the branched portion being arranged between the electrical transmission path connected to the low-pass filter, on which the control signal is transmitted and the transmission path and the electrical transmission path connected to the light emitting portion, on which the data signal is transmitted, so that the electrical transmission path on which the control signal is transmitted becomes high impedance when seen from the transmission path on which the data signal is transmitted.

* * * * *

UNITED STATES PATENT AND TRADEMARK OFFICE
CERTIFICATE OF CORRECTION

PATENT NO. : 8,380,062 B2  
APPLICATION NO. : 12/594725  
DATED : February 19, 2013  
INVENTOR(S) : Uno et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 646 days.

Signed and Sealed this
Seventeenth Day of September, 2013

Teresa Stanek Rea
*Deputy Director of the United States Patent and Trademark Office*